US011323375B2

(12) United States Patent
Onishi

(10) Patent No.: US 11,323,375 B2
(45) Date of Patent: May 3, 2022

(54) COMMUNICATION DEVICE, COMMUNICATION METHOD, AND COMPUTER READABLE MEDIUM

(71) Applicant: NEC Corporation, Tokyo (JP)

(72) Inventor: Takeo Onishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 17 days.

(21) Appl. No.: 16/772,968

(22) PCT Filed: Dec. 19, 2018

(86) PCT No.: PCT/JP2018/046867
§ 371 (c)(1),
(2) Date: Jun. 15, 2020

(87) PCT Pub. No.: WO2019/131404
PCT Pub. Date: Jul. 4, 2019

(65) Prior Publication Data
US 2021/0176175 A1 Jun. 10, 2021

(30) Foreign Application Priority Data
Dec. 27, 2017 (JP) .............................. JP2017-251548

(51) Int. Cl.
H04L 47/127 (2022.01)
H04W 28/02 (2009.01)
H04W 24/02 (2009.01)
(52) U.S. Cl.
CPC ............ H04L 47/127 (2013.01); H04L 47/14 (2013.01); H04W 24/02 (2013.01);
(Continued)

(58) Field of Classification Search
CPC ............ H04W 24/02; H04W 28/0226; H04W 28/0231; H04W 28/0289; H04L 47/127; H04L 47/14
See application file for complete search history.

(56) References Cited

U.S. PATENT DOCUMENTS 8,255,360 B1 * 8/2012 Wallace ................ G06F 16/273
707/620
8,811,372 B2 * 8/2014 Li ........................ H04W 56/002
370/350

(Continued)

FOREIGN PATENT DOCUMENTS

JP 2005-086216 A 3/2005
JP 2006-306472 A 12/2008

(Continued)

OTHER PUBLICATIONS

International Search Report for PCT Application No. PCT/JP2018/046867, dated Mar. 19, 2019.

(Continued)

Primary Examiner — Dominic E Rego

(57) ABSTRACT

In order to enable prediction of communication having high quality requirements, this communication device is provided with: a determination unit that determines that a change has occurred in the communication state of communication which is performed, with a device connected to a network, by each of a first terminal and a second terminal communicating with the device; and a derivation unit that, when the change in the second terminal is determined to be being occurring in synchronization with the change in the first terminal, derives a second change time at which the change occurs in the second terminal, on the basis of a first change time at which the change occurs in the first terminal.

13 Claims, 24 Drawing Sheets

(52) U.S. Cl.
CPC ... *H04W 28/0226* (2013.01); *H04W 28/0231* (2013.01); *H04W 28/0289* (2013.01)

(56) References Cited

U.S. PATENT DOCUMENTS

| | | | | |
|---|---|---|---|---|
| 10,136,262 | B2* | 11/2018 | Bhanage | H04W 4/029 |
| 2003/0188062 | A1* | 10/2003 | Luse | G06F 9/5011 |
| | | | | 710/104 |
| 2005/0063392 | A1 | 3/2005 | Ofuji et al. | |
| 2014/0018098 | A1* | 1/2014 | Racz | G01S 5/021 |
| | | | | 455/456.1 |
| 2014/0115202 | A1* | 4/2014 | Yoshinaga | G06F 13/426 |
| | | | | 710/62 |
| 2014/0229518 | A1* | 8/2014 | Wang | H04L 67/38 |
| | | | | 709/201 |
| 2015/0146637 | A1* | 5/2015 | Morita | H04W 8/005 |
| | | | | 370/329 |
| 2015/0163842 | A1* | 6/2015 | Kalhan | H04W 84/18 |
| | | | | 455/500 |
| 2015/0181584 | A1* | 6/2015 | Morita | H04W 76/14 |
| | | | | 455/452.1 |
| 2015/0195828 | A1* | 7/2015 | Fujishiro | H04W 48/16 |
| | | | | 370/329 |
| 2015/0245312 | A1* | 8/2015 | Ur | H04W 68/005 |
| | | | | 455/418 |
| 2015/0379101 | A1* | 12/2015 | Dowlatkhah | G06F 11/1451 |
| | | | | 707/624 |
| 2016/0057583 | A1* | 2/2016 | Nguyen | H04W 4/029 |
| | | | | 370/329 |
| 2016/0119866 | A1* | 4/2016 | Miyagi | H04W 24/02 |
| | | | | 370/311 |
| 2016/0127559 | A1* | 5/2016 | Baek | H04M 3/543 |
| | | | | 455/417 |
| 2016/0173580 | A1* | 6/2016 | Narita | H04L 67/10 |
| | | | | 709/205 |
| 2016/0242117 | A1 | 8/2016 | Lin et al. | |
| 2017/0289609 | A1* | 10/2017 | Liu | H04N 21/4307 |
| 2017/0315683 | A1* | 11/2017 | Boucher | G06F 3/0482 |
| 2017/0346858 | A1* | 11/2017 | Vashi | H04L 65/1073 |
| 2018/0001916 | A1 | 1/2018 | Aoyama et al. | |
| 2018/0139686 | A1* | 5/2018 | Kalhan | H04R 5/04 |
| 2018/0267760 | A1* | 9/2018 | Shimizu | H04N 9/77 |
| 2018/0317042 | A1* | 11/2018 | Kash | H04W 64/006 |

FOREIGN PATENT DOCUMENTS

| | | |
|---|---|---|
| JP | 2010-130650 A | 6/2010 |
| JP | 2017-500778 A | 1/2017 |
| JP | 2017-139629 A | 8/2017 |
| WO | 2016/139807 A1 | 9/2016 |

OTHER PUBLICATIONS

English translation of Written opinion for PCT Application No. PCT/JP2018/046867, dated Mar. 19, 2019.
"Proportionally fair," From Wikipedia, the free encyclopedia, the Internet page (https://en.wikipedia.org/w/index.php?title=Proportionally_fair&oldid=795251972) was edited on Aug. 13, 2017.
3GPP TS 36.211 V13.1.0 (Mar. 2016), Technical Specification, 3rd Generation Partnership Project; Technical Specification Group Radio Access Network; Evolved Universal Terrestrial Radio Access (E-UTRA); Physical channels and modulation (Release 13), France.
Japanese Office Action for JP Application No. 2019-561590 dated Aug. 31, 2021 with English Translation.

* cited by examiner

Fig.5

COMMUNICATION INFORMATION GROUP 201a

| TIME | SOURCE ADDRESS | SOURCE PORT | DESTINATION ADDRESS | DESTINATION PORT | SIZE |
|---|---|---|---|---|---|
| 13:01:31.243 | 10.0.0.1 | 19472 | 10.1.1.1 | 80 | 1500 |
| 13:01:31.453 | 10.1.1.1 | 80 | 10.0.0.1 | 19472 | 60 |
| 13:01:35.342 | 10.0.0.2 | 23989 | 10.1.1.1 | 443 | 520 |
| ... | ... | ... | ... | ... | ... |

Fig.6

SYNCHRONIZATION INFORMATION GROUP 202a

| TERMINAL ID PAIR | ELEMENT INFORMATION |
|---|---|
| (10.0.0.1, 10.0.0.2) | (10, 0, 7) |
| (10.0.0.1, 10.0.0.3) | (10, 0, 3), (60, 0, 2) |
| (10.0.0.3, 10.0.0.4) | (50, 0, 5) |

SYNCHRONIZATION INFORMATION 206a
SYNCHRONIZATION INFORMATION 206b
SYNCHRONIZATION INFORMATION 206c

Fig.12

COMMUNICATION INFORMATION GROUP 201b

| TIME | SOURCE ADDRESS | SOURCE PORT | DESTINATION ADDRESS | DESTINATION PORT | SIZE |
|---|---|---|---|---|---|
| ... | ... | ... | ... | ... | ... |
| 13:01:31.243 | 10.0.0.1 | 19472 | 10.1.1.1 | 80 | 1500 |
| 13:01:31.453 | 10.1.1.1 | 80 | 10.0.0.1 | 19472 | 60 |
| 13:01:35.342 | 10.0.0.2 | 23989 | 10.1.1.1 | 443 | 520 |

COMMUNICATION DEVICE, COMMUNICATION METHOD, AND COMPUTER READABLE MEDIUM

This application is a National Stage Entry of PCT/JP2018/046867 filed on Dec. 19, 2018, which claims priority from Japanese Patent Application 2017-251548 filed on Dec. 27, 2017, the contents of all of which are incorporated herein by reference, in their entirety.

TECHNICAL FIELD

The present invention relates to a device monitoring a communication state.

BACKGROUND ART

In addition to mobile phone terminals, so-called Internet of Things (IoT) equipment such as a camera and a sensor has been performing communication through a mobile communication network. When many pieces of IoT equipment are installed in a certain cell in a mobile communication network, congestion occurs in communication processing performed by a base station related to the cell in which the pieces of IoT equipment are installed. The congestion is particularly remarkable in a time period in which the pieces of IoT equipment operate. Accordingly, positional or temporal unevenness in a degree of congestion in communication is remarkable in a cell in which many pieces of IoT equipment are connected, due to increase in connected pieces of IoT equipment. Consequently, in some cases, a communication quality requirement required for providing services cannot be satisfied particularly in a congested time period in such a cell.

Even when a mobile communication network is congested, a frequency of each communication falling below required quality may be held down in network equipment such as, for example, a base station by performing suitable communication control fitted for a communication quality requirement required for each communication and/or importance of the communication.

For example, a method disclosed by PTL 1 changes an allocation priority of a wireless resource to a terminal, based on an allowable packet delay set based on a performance requirement required for an application. The method preferentially allocates a wireless resource to a packet approaching the allowable delay. Consequently, the method may raise a possibility of satisfying performance quality required for the application.

When a communication terminal receives a plurality of media such as a dynamic image and a voice, a method disclosed by PTL 2 analyzes a correlation of a degree of quality degradation between the media. Then, the method predicts quality degradation of a medium from a degree of quality degradation of another medium. Then, the method attempts to suppress quality degradation by previously optimizing data traffic to be transmitted with respect to a medium for which degradation is predicted.

NPL 1 discloses an example of a method of allocating a wireless resource to a terminal. NPL 2 discloses an example of a content of a wireless resource.

CITATION LIST

Patent Literature

PTL 1: Japanese Unexamined Patent Application Publication No. 2005-086216
PTL 2: Japanese Unexamined Patent Application Publication No. 2010-130650

Non Patent Literature

NPL 1: WIKIPEDIA, The Free Encyclopedia, "Proportionally fair," [retrieved on Nov. 15, 2017], the Internet (https://en.wikipedia.org/wiki/Proportionally_fair)
NPL 2: 3GPP TS 36.211 V13.1.0 (2016 March), [retrieved on Dec. 22, 2017], the Internet (https://www.arib.or.jp/english/html/overview/doc/STD-T104v4_00/5_Appendix/Rel13/36/36211-d10.pdf)

SUMMARY OF INVENTION

Technical Problem

For example, it is considered that the methods disclosed by PTLs 1 and 2 may satisfy a communication requirement for an application operating on a smartphone. However, the methods may not be able to satisfy a communication requirement for IoT equipment such as a camera and a sensor. The reason is that communication by IoT equipment has a characteristic different from communication by a smartphone. Details of the reason will be described below.

One smartphone terminal uses a plurality of applications and media, and mainly performs downstream communication being communication for downloading data from a server on the Internet. On the other hand, IoT equipment such as a camera and a sensor mainly performs upstream communication for uploading data to a server on the Internet.

An information processing terminal such as a camera or a temperature sensor observes status of an ambient environment and uploads the result to a server on the Internet. When communication control is performed in a base station in a mobile communication network, communication control of, based on a packet arriving at the base station, allocating a wireless resource to a high-priority packet, based on a communication requirement, by, for example, the method disclosed by PTL 1 can be performed with respect to downstream communication.

However, communication control based on a packet is difficult with respect to upstream communication. In upstream communication, an information processing terminal merely notifies a base station that a packet to be transmitted exists. Subsequently, the information processing terminal allocates, to the base station, a wireless resource for transmitting data. Consequently, when allocating wireless resources to information processing terminals, the base station does not have information about by which information processing terminal a packet transmitted by an information processing terminal is sent. Accordingly, in upstream communication, the base station cannot make a communication related to communication processing of a packet satisfy a quality requirement by changing, by an information processing terminal sending the packet, an allocation of a communication resource used for the communication processing, by the method disclosed by PTL 1.

On the other hand, when information that a packet with a high quality requirement is scheduled to be transmitted from a terminal previously exists, the base station can preferentially allocate a wireless resource to the terminal transmitting the packet with the high quality requirement. Consequently, the quality requirement for communication can be satisfied. However, a method of predicting a communication with a high quality requirement in order to satisfy the communication quality requirement is not known.

An object of the present invention is to provide a communication device and the like that may enable prediction of a communication with a high quality requirement.

Solution to Problem

A communication device according to the present invention includes: a determination unit that determines occurrence of a change in a communication state of a communication performed between each of a first terminal and a second terminal that communicate with a device connected to a network, and the device; and a derivation unit that, when occurrence of the change of the second terminal in synchronization with the change of the first terminal is determined, derives a second change time at which the change occurs in the second terminal, based on a first change time at which the change occurs in the first terminal.

Advantageous Effects of Invention

A communication device and the like according to the present invention may enable prediction of a packet with a high quality requirement.

BRIEF DESCRIPTION OF DRAWINGS

FIG. 5 is a diagram illustrating an example of a communication information group.

FIG. 6 is a diagram illustrating an example of a synchronization information group.

FIG. 12 is a diagram illustrating an example of a communication information group.

EXAMPLE EMBODIMENT

First Example Embodiment

Configuration and Operation

Figure 1:
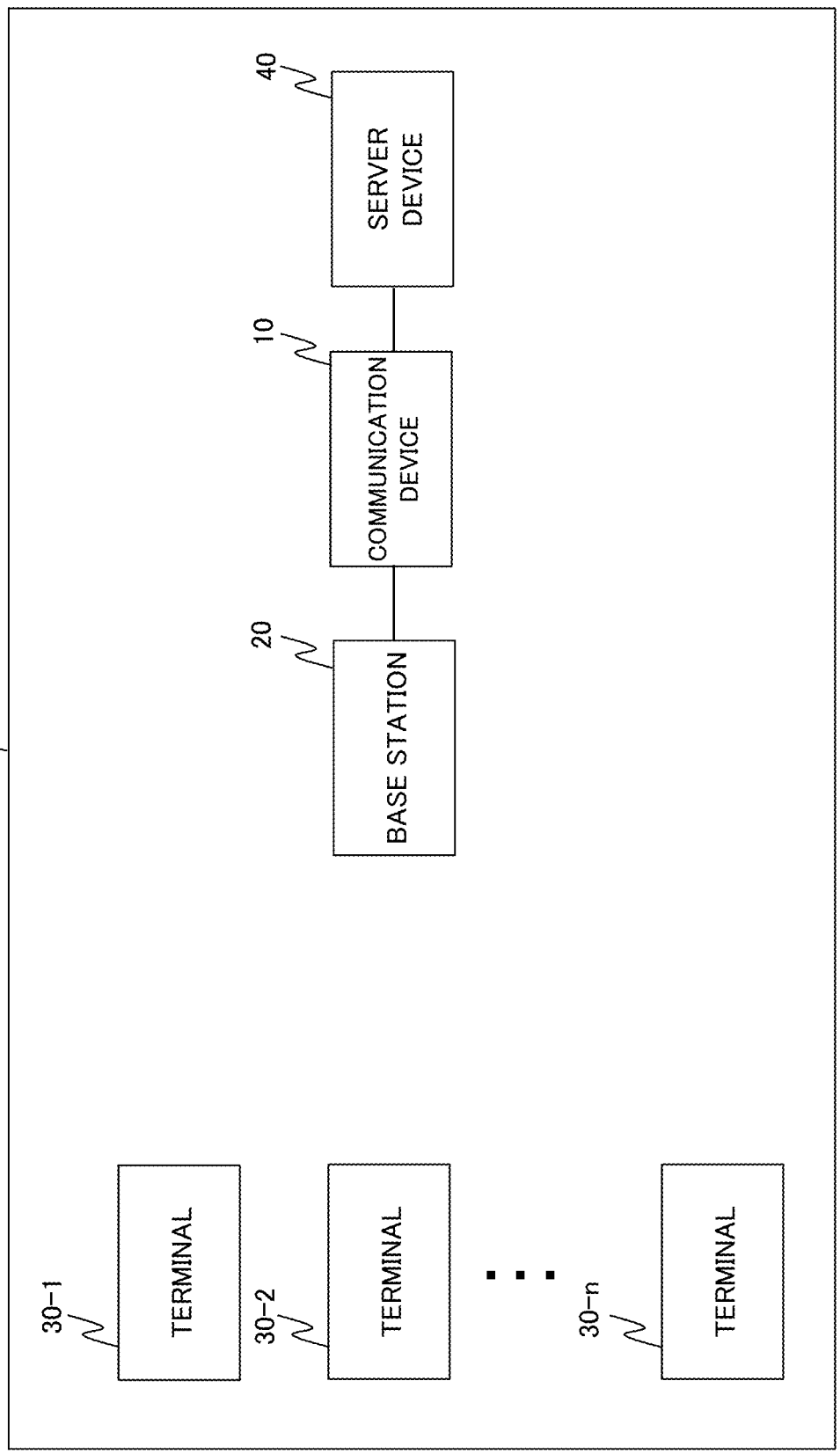
FIG. 1 is a conceptual diagram illustrating a configuration example of a communication system according to a first example embodiment.

FIG. 1 is a conceptual diagram illustrating a configuration of a communication system 100 being an example of a communication system according to a first example embodiment.

The communication system 100 includes a communication device 10, a base station 20, a server device 40, and terminals 30-1 to 30-n being n terminals. Each of the terminals 30-1 to 30-n or a plurality of terminals out of the terminals 30-1 to 30-n may be simply referred to as a terminal or terminals in the description of the example embodiments.

While illustration is omitted, the communication system 100 may include a plurality of server devices 40. The communication device 10 does not necessarily need to be independent equipment. For example, the communication device 10 may be built into the base station 20 or the server device 40.

The communication device 10 monitors a communication state of a communication performed between a terminal and the server device 40. Then, as will be described later, the communication device 10 derives, from a change timing of the communication state, priority information being information for specifying a temporal change of a priority related to a communication related to each terminal and sends the priority information to the base station 20.

The communication device 10 is placed at a position allowing monitoring of a communication between each terminal and the server device 40. For example, the position is a neighborhood of the base station 20 or a neighborhood of the server device 40.

For example, the base station 20 performs transmission and reception of data to and from a terminal by wireless communication such as LTE. Note that LTE stands for Long Term Evolution. The base station 20 relays a communication between a terminal and the server device 40.

The base station 20 performs allocation of a communication resource being included in the base station 20 and being related to a communication performed by each terminal. Each terminal performs data transmission and reception by use of a communication resource allocated by the base station 20.

When priority information is sent from the communication device 10, the base station 20 also changes an allocation of a communication resource to each terminal, based on the priority information. Priority information will be described later.

Each terminal is an information processing terminal performing predetermined information processing. Each terminal transmits data to the server device 40 through the base station 20. The data are acquired or generated by the terminal. For example, a terminal is equipment capable of observing some physical quantity around the terminal, such as a network camera, a human sensor, or an acceleration sensor. A network camera or the like is merely an example, and a terminal may be any type of terminal. For example, a terminal may be equipment receiving data transmitted from a network camera or an acceleration sensor by a wired line or a wireless technology such as Bluetooth (registered trademark) and relaying the data to the server device 40.

The server device 40 is communication equipment communicating with a terminal. The server device 40 receives at least data transmitted by a terminal.

Figure 2:
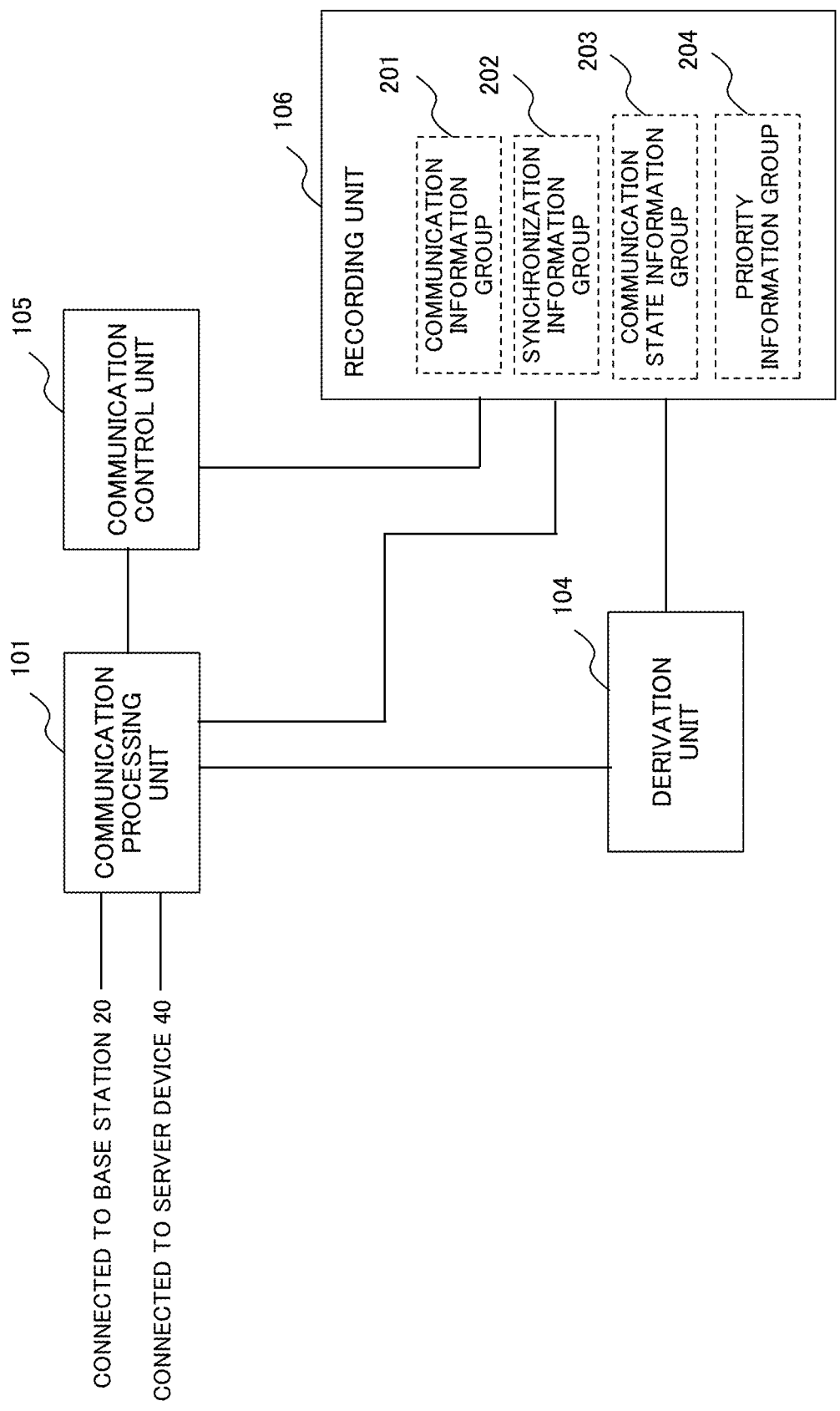
FIG. 2 is a conceptual diagram illustrating a configuration example of a communication device.

FIG. 2 is a conceptual diagram illustrating a configuration of a communication device 10*a* being an example of the communication device 10 illustrated in FIG. 1.

The communication device 10*a* includes a communication processing unit 101, a derivation unit 104, a communication control unit 105, and a recording unit 106.

The communication processing unit 101 receives a packet sent from the base station 20 to the server device 40 or a packet sent from the server device 40 to the base station 20. The communication processing unit 101 acquires communication information from a received packet. Then, the communication processing unit 101 causes the acquired communication information to be stored in a communication information group 201 held by the recording unit 106.

For example, the communication information is information including a reception time of a packet, information indicating a source and a destination of the packet, and a packet size. For example, the information about a source and a destination is Internet Protocol (IP) addresses related to the source and the destination.

An example of communication information which the communication processing unit 101 causes the recording unit 106 to record will be described later with reference to FIG. 5.

The communication processing unit 101 also acquires communication state information indicating a state of a communication between the base station 20 and the server device 40 for each terminal. For example, the communication state information is whether a terminal is in a communication state in which the terminal performs a communication, a communication frequency, a packet size, increase or decrease in a communication delay, or a communication rate, or any combination thereof. The communication processing unit 101 causes the acquired communication state information to be stored in a communication state information group 203. For each terminal, the communication processing unit 101 causes the communication state information successively acquired with an elapse of time to be held in the communication state information group 203 in the recording unit 106 for, for example, at least a certain period preceding the time at which the information is last acquired.

The communication processing unit 101 also transfers, to the server device 40, a packet sent from the base station 20. The communication processing unit 101 also transfers, to the base station 20, a packet sent from the server device 40.

The derivation unit 104 specifies two terminals, based on communication information included in the communication information group 201 held by the recording unit 106. The two specified terminals are hereinafter referred to as a terminal pair, and each terminal in a terminal pair is referred to as a specified terminal.

It is assumed here that a terminal has an IP address in a range from 10.0.0.1 to 10.0.0.254 being an IP address in a range "10.0.0.0/24." In that case, the derivation unit 104 searches communication information in the communication information group 201. Then, the derivation unit 104 retrieves IP addresses included in the range "10.0.0.0/24" out of IP addresses recorded as sources or destinations of packets included in the communication information. The derivation unit 104 specifies the terminal pair by specifying two relevant IP addresses.

The derivation unit 104 also specifies a change time being a time at which a change in a communication state occurs during the most recent certain period for each piece of communication state information about the selected terminal pair. For example, as described above, a communication state of a terminal is whether the terminal is in a communication state, a communication frequency, a packet size, increase or decrease in a communication delay, or a communication rate, or any combination thereof related to the terminal.

It is assumed here that the derivation unit 104 makes a determination about existence of a change in a communication state by determining whether a terminal is in a communication state. In that case, the derivation unit 104 specifies, as the change times, a time at which a communication state is converted to a state in which communication is not performed and a time at which a state in which communication is not performed changes to a communication state.

For example, it is assumed that a terminal includes an acceleration sensor transmitting an acceleration being an observed value only when a motion is detected. In that case, the change times are a time at which a communication from the acceleration sensor starts and a time at which the communication stops.

When the communication state information is a communication frequency, the derivation unit 104 specifies a time at which the communication frequency changes as the change time.

For example, it is assumed that a terminal transmits packets to the server device 40 on a 1-minute cycle, and the packet transmission cycle changes to 1 second. In that case, the time at which the communication frequency changes is included in the change time.

Some acceleration sensors transmit an acceleration being an observed value with high frequency only when a motion is detected and transmit an observed value with low frequency when a motion is not detected. In this case, the derivation unit 104 specifies a time at which a change in a communication frequency of a terminal is determined as a time at which a communication state of the terminal changes.

In a case of a terminal cyclically performing communication, when a communication is performed at a time different from a time calculated from the cycle, the derivation unit 104 may specify the time as the change time. For example, it is assumed that a terminal performs communication on a 1-minute cycle, and the most recent communication is at "13:06:53." Then, it is assumed that a next communication is observed at "13:07:11." In that case, one minute has not elapsed between the time "13:06:53" and the time "13:07:11," and therefore a communication is performed at a time different from a time calculated from the cycle. In that case, the derivation unit 104 specifies the time "13:07:11" as the change time.

The derivation unit 104 may extract a time at which traffic per unit time transmitted and received by a terminal changes as the change time.

For example, it is assumed that a terminal transmits data at 0.1 Mbps, and the communication rate subsequently changes to 1 Mbps. In that case, the derivation unit 104 specifies the time at which the traffic per unit time changes as the change time.

Some network cameras change a communication rate when a change occurs in an image. By using a communication rate as a communication state, the derivation unit 104 detects a change in the communication state accompanying such a change in a sensing target of equipment. Then, the derivation unit 104 specifies the time at which the communication state of a terminal changes as the change time.

As described above, the derivation unit 104 specifies a change time being a time at which a communication state changes in a predetermined period for each terminal in the terminal pair. For example, the period is a period required for acquiring a histogram to be described later illustrated in FIG. 14 and is, for example, 5 minutes.

For example, a detailed example of a specification method of a change time for a target terminal by the derivation unit 104 is as follows.

It is assumed that the communication processing unit 101 illustrated in FIG. 2 continuously makes a determination of whether a packet is received from a target terminal being a target out of the terminals 30-1 to 30-n illustrated in FIG. 1. Then, it is assumed that the communication processing unit 101 successively records a reception time at which a packet is received from the target terminal. The successively recorded reception times constitute communication state information of the target terminal.

The derivation unit 104 specifies a period in which a reception time does not exist for a time T1 or longer in the reception times read from the recording unit 106 as a non-communication period. The communication processing unit 101 determines a period other than a non-communication period as an in-communication period.

Then, the communication processing unit 101 specifies a time at which the in-communication period changes to the non-communication period and a time at which the non-communication period changes to the in-communication period as the change times.

Next, the derivation unit 104 determines whether at least part of the change times in a group composed of the change times of one terminal is synchronized with at least part of the change times in a group composed of the change times of another terminal. At least part of the change times in a group composed of the change time of one terminal being synchronized with at least part of the change times in a group composed of the change times of another terminal may be hereinafter simply referred to as "being synchronized." The derivation unit 104 also derives a synchronization time difference with respect to change times. The synchronization time difference is a time difference between the change time of the one terminal and the change time of the another terminal, the change times being synchronized with each other. The synchronization time difference takes a negative value when a change time of a second terminal is ahead of a change time of a first terminal.

For example, the synchronization time difference is a high-frequency time difference. The high-frequency time difference is a time being significantly large in number out of times by each of which a change time of a second terminal being one of the terminal pair is behind a change time of a first terminal being the other of the terminal pair. Significantly large in number here refers to being larger in number than a preset threshold value. The high-frequency time difference takes a negative value when a change time of the second terminal is ahead of a change time of the first terminal.

A specific example of the aforementioned determination of whether one terminal is synchronized with another terminal at the specified change time and a derivation method of the high-frequency time difference will be described later with reference to FIG. 10.

Then, the derivation unit 104 calculates a synchronization ratio indicating a ratio of one terminal being synchronized with another terminal at a specified change time. A specific example of a derivation method of a synchronization ratio will be described later with reference to FIG. 10.

Then, the derivation unit 104 derives synchronization information acquired by combining a terminal ID pair including a terminal ID of the first terminal and a terminal ID of the second terminal with element information including the high-frequency time difference and the synchronization ratio. Note that ID stands for identifier. It is assumed in the terminal ID pair that a terminal ID of the first terminal and a terminal ID of the second terminal can be distinguished. It is further assumed in the element information that the high-frequency time difference can be distinguished from the synchronization ratio. The derivation unit 104 causes the derived synchronization information to be stored in a synchronization information group 202 illustrated in FIG. 2.

The derivation unit 104 performs the processing described above for each of the terminal ID pairs.

For example, it is assumed here that changes of a communication state occur 100 times in the terminal 30-1. Then, it is assumed that communication state changes occur 70 times in the terminal 30-2 after 10 seconds being a high-frequency time difference of the change times of the terminal 30-1. In this case, 70 out of 100 change times of the terminal 30-1 are synchronized with change times of the terminal 30-2. Accordingly, in this case, the synchronization ratio is determined to be 0.7 acquired by dividing 70 by 100. Then, the derivation unit 104 derives element information being (10 seconds, 0.7) and generates synchronization information associated with the terminal ID pair related to a terminal ID of the terminal 30-1 and a terminal ID of the terminal 30-2. Then, the derivation unit 104 causes the derived synchronization information to be stored in the synchronization information group 202. An example of the synchronization information group 202 will be described later with reference to FIG. 6.

The communication control unit 105 derives priority information related to a communication performed by each terminal, based on the synchronization information group 202 held by the recording unit 106. The priority information will be described in the next paragraph. The communication control unit 105 causes the derived priority information to be stored in a priority information group 204 in association with a terminal ID of a terminal related to the priority information. At that time, when priority information of the terminal ID related to the priority information to be stored in the priority information group 204 is already stored in the priority information group 204, the communication control unit 105 causes the already stored priority information to be updated by the priority information to be stored.

For example, a content of the priority information is, when the base station 20 illustrated in FIG. 1 performs communication processing related to a first packet, causing the base station 20 to preferentially secure a communication resource for communication processing of a second packet when a predetermined time elapses after the transmission time. An example of preferential allocation of a wireless resource corresponding to the aforementioned preferential securing of a communication resource is disclosed in PTL 1. An example of a content of a wireless resource is disclosed in NPL 2.

For example, NPL 1 discloses that a base station allocates a communication resource to a terminal by a proportional fair method in LTE. An item under weighted fair queuing in NPL 1 describes that proportional fair can be provided by adjusting a weight in weighted fair queuing. Accordingly, for example, by causing the base station 20 to add a priority derived by the communication device 10 to the aforementioned weight, the communication device 10 can adjust a communication resource allocated to the terminal by the base station 20.

Aside from the aforementioned method, the communication device 10 may adjust communication resources allocated to terminals by causing the base station 20 to allocate all the communication resources to a terminal with the highest priority.

For example, the priority information includes a terminal ID of a preferred terminal and a range of a time at which the preference is performed. In addition to the above, the priority information may include a priority indicating a degree of preference of a communication related to the terminal.

The first packet is a packet related to the first terminal. The first packets include both a packet transmitted to the first terminal by the base station 20 and a packet received from the first terminal by the base station 20.

The second packet is a packet related to the second terminal. The second packets include both a packet transmitted to the second terminal by the base station 20 and a packet received from the second terminal by the base station 20.

For example, the time is a time included in the aforementioned synchronization information derived for the first terminal and the second terminal. It is assumed here that the change time related to the first terminal is synchronized with the change time related to the second terminal. It is further assumed that the change time related to the second terminal is behind the change time related to the first terminal by the high-frequency time difference.

The time does not necessarily be equal to the high-frequency time difference and may be a predetermined value derived from the high-frequency time difference.

When processing related to a packet related to the first terminal is performed in the base station 20, it is highly likely that processing related to a packet related to the second terminal is performed in the base station 20 at a time behind the time by a predetermined time linked with the high-frequency time difference. Accordingly, the communication device 10 send the information to the base station 20 and allows the base station 20 to secure a communication resource required for communication processing related to a packet related to the second terminal.

The communication control unit 105 causes the derived priority information to be stored in the priority information group 204 illustrated in FIG. 2.

The communication control unit 105 causes the priority information group 204 to be sent to the base station 20 illustrated in FIG. 1 at a predetermined timing. The base station 20 secures a communication resource in the base station 20 allocated to communication processing related to a packet in accordance with each piece of priority information included in the sent priority information group 204.

As described above, the recording unit 106 holds the communication information group 201, the synchronization information group 202, the communication state information group 203, and the priority information group 204. In the initial state, the recording unit 106 holds the information groups with empty contents.

The recording unit 106 also holds programs and information required for each of the communication processing unit 101, the derivation unit 104, and the communication control unit 105 to perform the aforementioned processing.

The recording unit 106 also records information indicated by each of the communication processing unit 101, the derivation unit 104, and the communication control unit 105.

The recording unit 106 also sends information indicated by each of the communication processing unit 101, the derivation unit 104, and the communication control unit 105 to an indicated destination.

Figure 3:
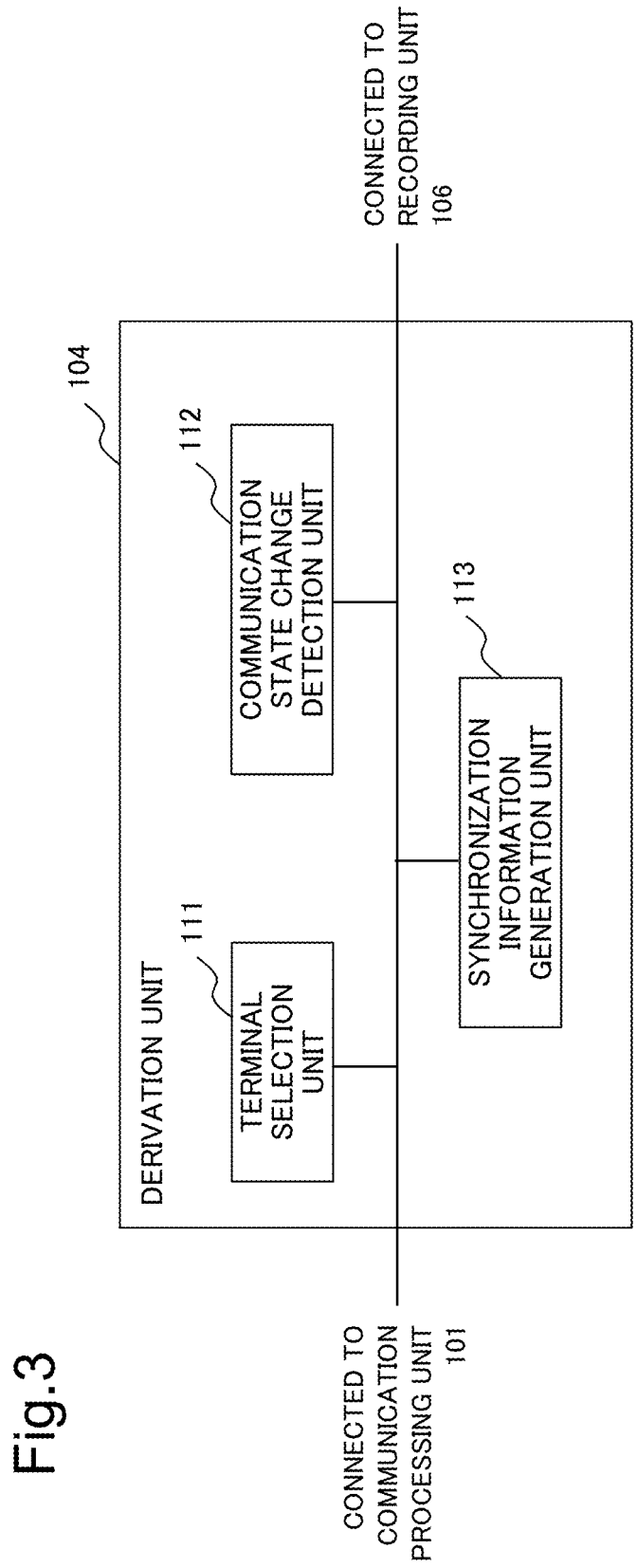
FIG. 3 is a conceptual diagram illustrating a configuration example of a derivation unit.

FIG. 3 is a conceptual diagram illustrating a configuration example of the derivation unit 104 illustrated in FIG. 2.

The derivation unit 104 illustrated in FIG. 3 includes a terminal selection unit 111, a communication state change detection unit 112, and a synchronization information generation unit 113.

The terminal selection unit 111 performs a part related to the specification of the terminal pair in the operation performed by the aforementioned derivation unit 104.

The communication state change detection unit 112 performs a part related to detection of the communication state change in the operation performed by the aforementioned derivation unit 104.

The synchronization information generation unit 113 performs a part related to generation of the synchronization information in the operation performed by the aforementioned derivation unit 104.

Figure 4:
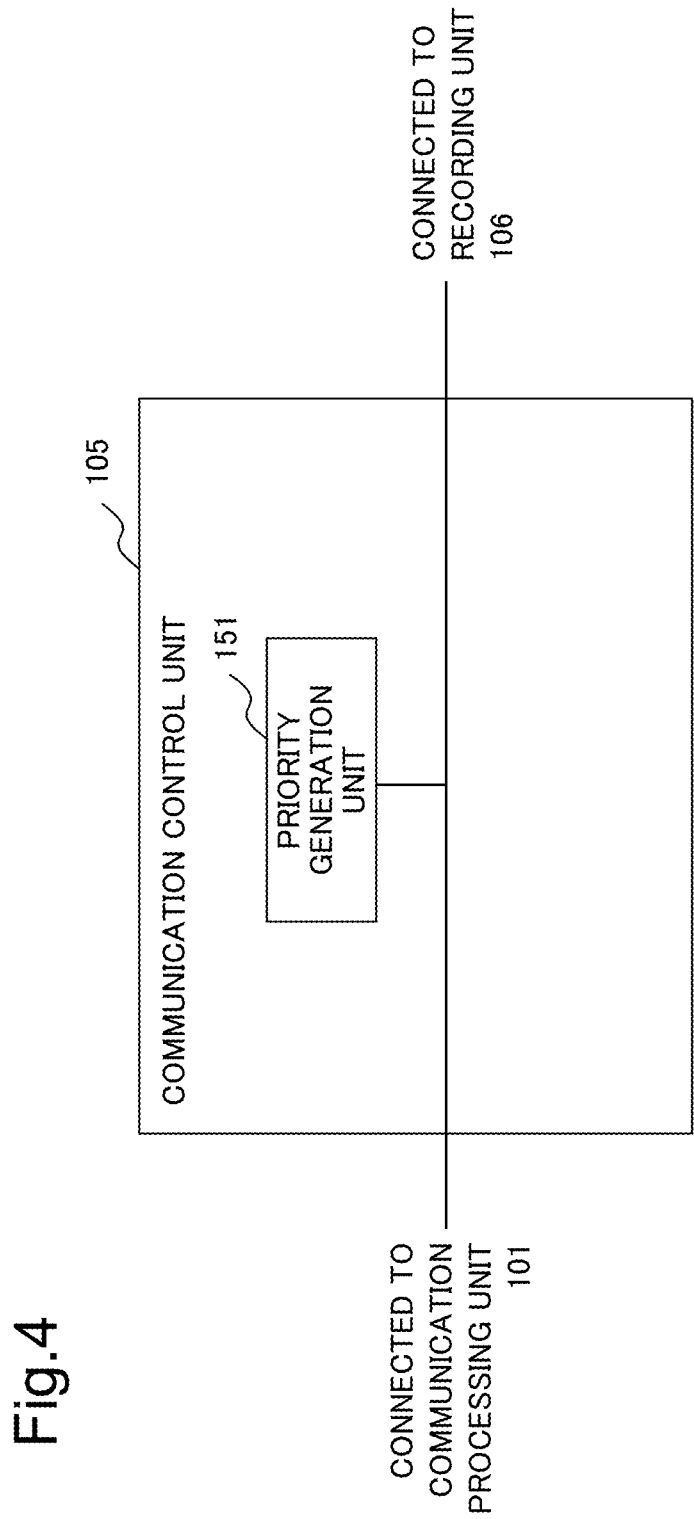
FIG. 4 is a conceptual diagram illustrating a configuration example of a communication control unit.

FIG. 4 is a conceptual diagram illustrating a configuration example of the communication control unit 105 illustrated in FIG. 2.

The communication control unit 105 illustrated in FIG. 4 includes a priority generation unit 151.

The priority generation unit 151 is a part performing an operation related to generation of the priority information performed by the communication control unit 105 illustrated in FIG. 2.

FIG. 5 is a diagram illustrating a communication information group 201a being an example of the communication information group 201 illustrated in FIG. 2.

Each row constituting the communication information group 201a is the aforementioned communication information.

Each piece of communication information includes a time at which the communication processing unit 101 acquires a packet, a source address, a source port, a destination address, and a destination port of the packet, and the packet size.

A packet related to communication information described in the first row in FIG. 5 is sent from a terminal having an IP address "10.0.0.1" by use of a source port "19472." The packet is also transmitted toward a port "80" on the server device 40 having an IP address "10.1.1.1." The communication processing unit 101 has acquired the "packet" at a time "13:01:31.243."

The communication information may include information other than the above. For example, the communication information may include a media access control (MAC) address as information indicating a source and a destination. The communication information may also include header information included in a packet, such as a Transmission Control Protocol (TCP) header or a Hypertext Transfer Protocol (HTTP) header. The communication information may also include packet data themselves.

When communication information includes header information of a packet, or the like, a terminal communication state can be more precisely estimated based on the header information.

FIG. 6 is a diagram illustrating a synchronization information group 202a being an example of the synchronization information group 202 illustrated in FIG. 2.

The synchronization information group 202a includes synchronization information 206a to 206c.

Each piece of the synchronization information 206a to 206c is acquired by combining a terminal ID pair related to the terminal pair with the element information including the high-frequency time difference and the synchronization ratio.

The synchronization information 206a indicates that, in the terminal pair identified by 10.0.0.1 and 10.0.0.2, synchronization of communication state changes occurs with a 10 second-difference with a probability of 0.7.

The synchronization information 206b indicates an example of a plurality of pieces of element information being combined for one terminal ID pair.

Processing Flow Example

Figure 7:
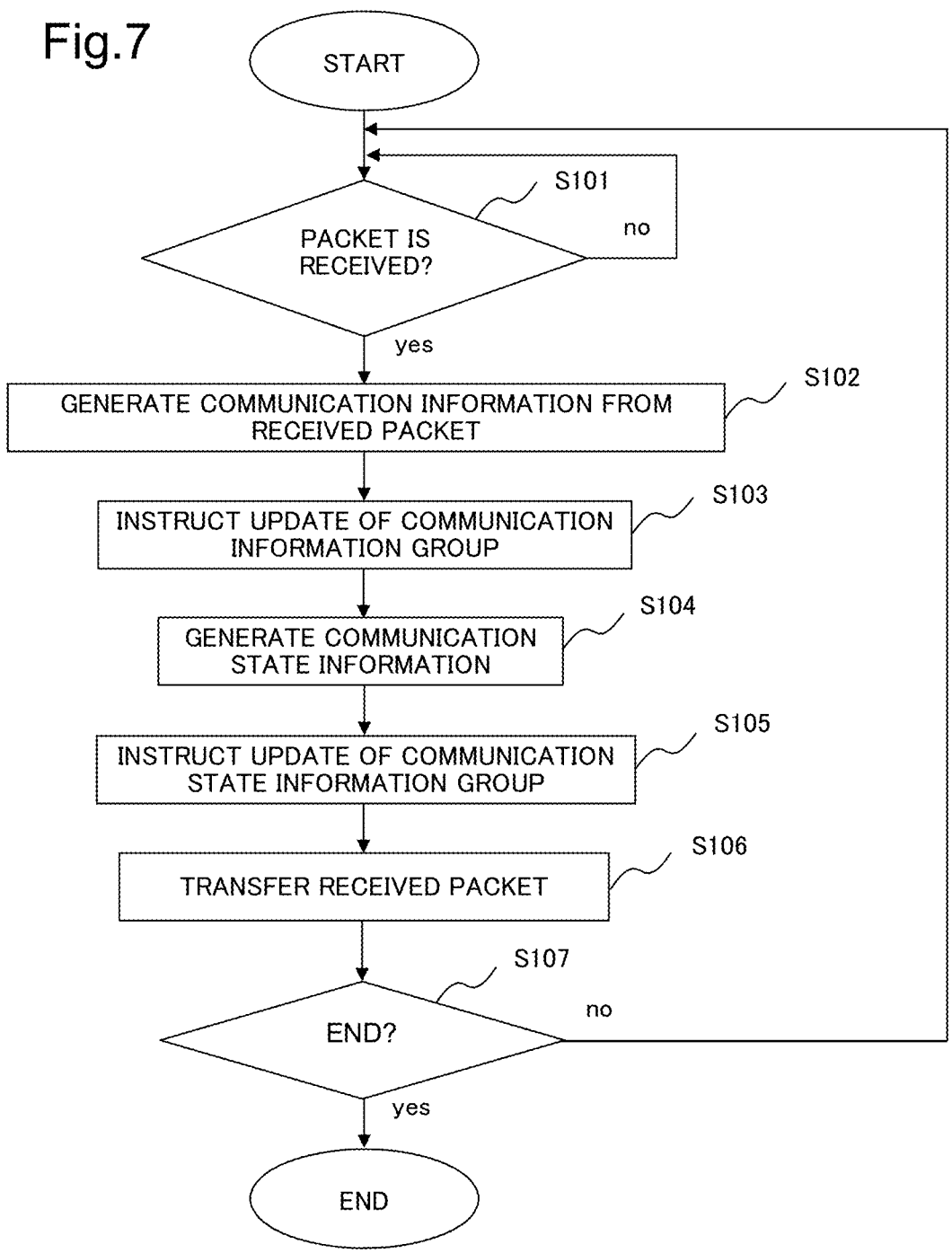
FIG. 7 is a conceptual diagram illustrating a processing flow example of processing performed by a communication processing unit.

FIG. 7 is a conceptual diagram illustrating a processing flow example of processing performed by the communication processing unit 101 illustrated in FIG. 2.

For example, the communication processing unit 101 performs the processing illustrated in FIG. 7 by external input of start information.

Then, as processing in S101, the communication processing unit 101 determines whether a packet sent from the base station 20 or the server device 40 illustrated in FIG. 1 is received.

When the determination result by the processing in S101 is yes, the communication processing unit 101 performs processing in S102.

On the other hand, when the determination result by the processing in S101 is no, the communication processing unit 101 performs the processing in S101 again.

When performing the processing in S102, the communication processing unit 101 extracts a reception time of a received packet, information indicating a source and a destination of the packet, and the packet size that are included in the packet, and generates the aforementioned communication information including the above, as the processing.

Next, as processing in S103, the communication processing unit 101 causes the communication information group 201 illustrated in FIG. 2 to be updated with the communication information generated by the processing in S102.

Then, as processing in S104, the communication processing unit 101 generates communication state information. For example, the communication state information is information indicating that a terminal related to the packet received by the processing in S102 is in the communication state at the reception time of the packet.

Then, as processing in S105, the communication processing unit 101 causes the communication state information group 203 held by the recording unit 106 to be updated with the communication state information generated in the processing in S104.

Next, as processing in S106, the communication processing unit 101 transfers the packet received by the processing in S102 to the base station 20 or the server device 40 illustrated in FIG. 1.

Then, as processing in S107, the communication processing unit 101 determines whether to end the processing illustrated in FIG. 7. For example, the communication processing unit 101 makes the determination by determining existence of external input of end information.

When the determination result by the processing in S107 is yes, the communication processing unit 101 ends the processing illustrated in FIG. 7.

On the other hand, when the determination result by the processing in S107 is no, the communication processing unit 101 performs the processing in S101 again.

Figure 8:
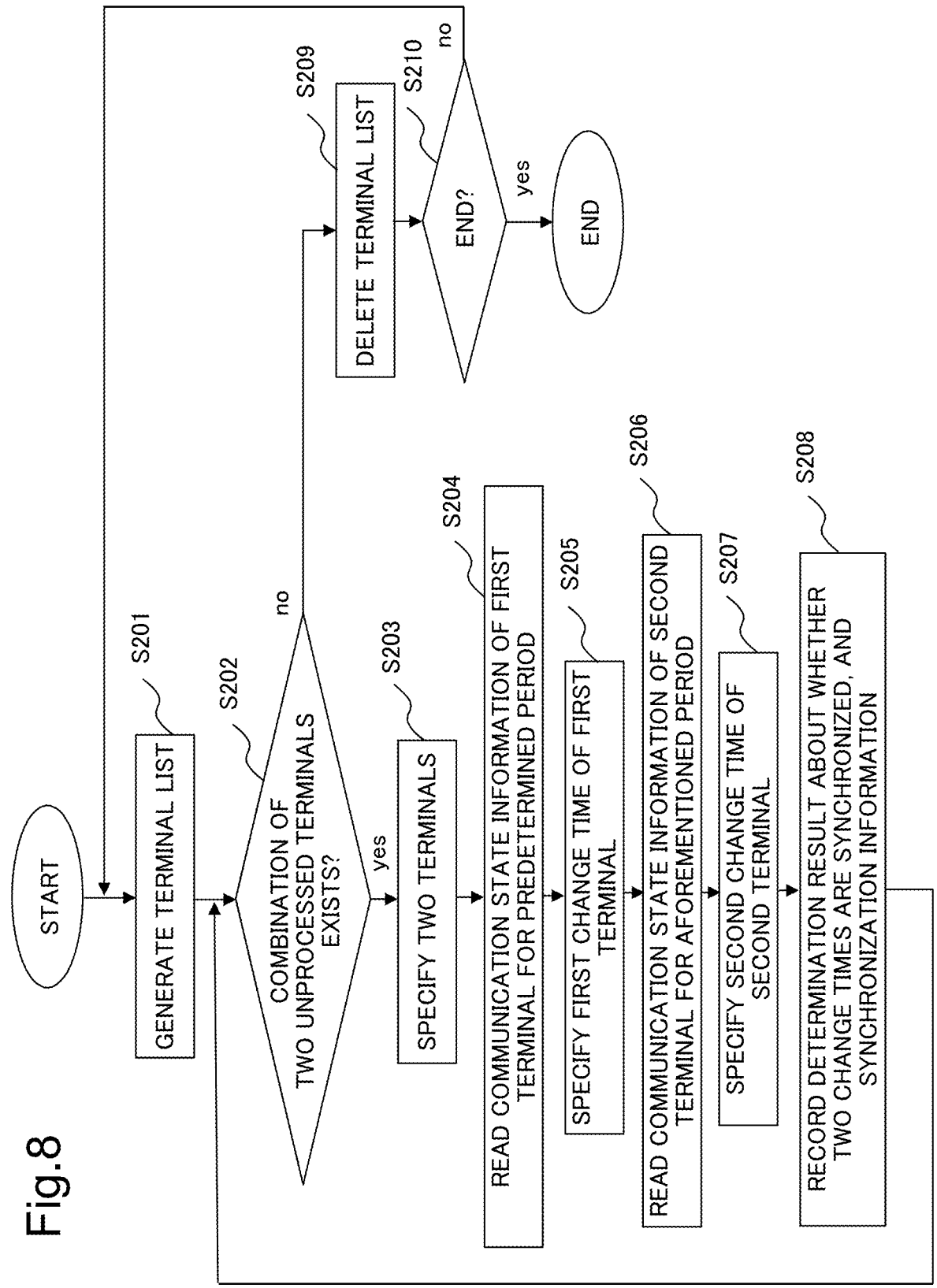
FIG. 8 is a conceptual diagram illustrating a processing flow example of processing performed by the derivation unit.

FIG. 8 is a conceptual diagram illustrating a processing flow example of processing performed by the derivation unit 104 illustrated in FIG. 2.

For example, the derivation unit 104 starts the processing illustrated in FIG. 8 by external input of start information.

Then, as processing in S201, the derivation unit 104 generates a list of terminals included in communication information in the communication information group 201 illustrated in FIG. 2 and causes the recording unit 106 illustrated in FIG. 2 to hold the list.

Then, the derivation unit 104 determines whether a terminal pair being included in the list generated by the processing in S201 and not yet undergoing processing in S203 exists.

When the determination result by the processing in S202 is yes, the derivation unit 104 performs the processing in S203.

On the other hand, when the determination result by the processing in S202 is no, the derivation unit 104 performs processing in S209.

When performing the processing in S203, the derivation unit 104 specifies the terminal pair being included in the terminal list and not yet undergoing the processing, as the processing.

Then, as processing in S204, the derivation unit 104 reads communication state information of a first terminal for the most recent predetermined period from the communication state information group 203 illustrated in FIG. 2.

Then, as processing in S205, the derivation unit 104 specifies a first change time being the change time related to the first terminal in the period and causes the recording unit 106 to hold the first change time. When a first change time in the period cannot be specified, the derivation unit 104 causes the recording unit 106 to hold information indicating that a first change time does not exist.

Next, as processing in S206, the derivation unit 104 reads communication state information of a second terminal for the period described in the description of S204 from the communication state information group 203 held by the recording unit 106 illustrated in FIG. 2.

Then, as processing in S207, the derivation unit 104 specifies a second change time being the change time related to the second terminal in the period and causes the recording unit 106 to hold the second change time. When a second change time in the period cannot be specified, the derivation unit 104 causes the recording unit 106 to hold information indicating that a second change time does not exist.

Next, as processing in S208, the derivation unit 104 determines whether each of the first change times specified by the processing in S205 is synchronized with each of the second change times specified by the processing in S207. The derivation unit 104 further derives synchronization information as the processing. A detailed example of the processing in S208 will be described later with reference to FIG. 9.

When performing the processing in S209, the derivation unit 104 causes the recording unit 106 to delete the terminal list generated by the processing in S201, as the processing.

Then, as processing in S210, the derivation unit 104 determines whether to end the processing illustrated in FIG. 8. For example, the derivation unit 104 makes the determination by determining existence of external input of end information.

When the determination result by the processing in S210 is yes, the derivation unit 104 ends the processing illustrated in FIG. 8.

On the other hand, when the determination result by the processing in S210 is no, the derivation unit 104 performs the processing in S201 again.

Figure 9:
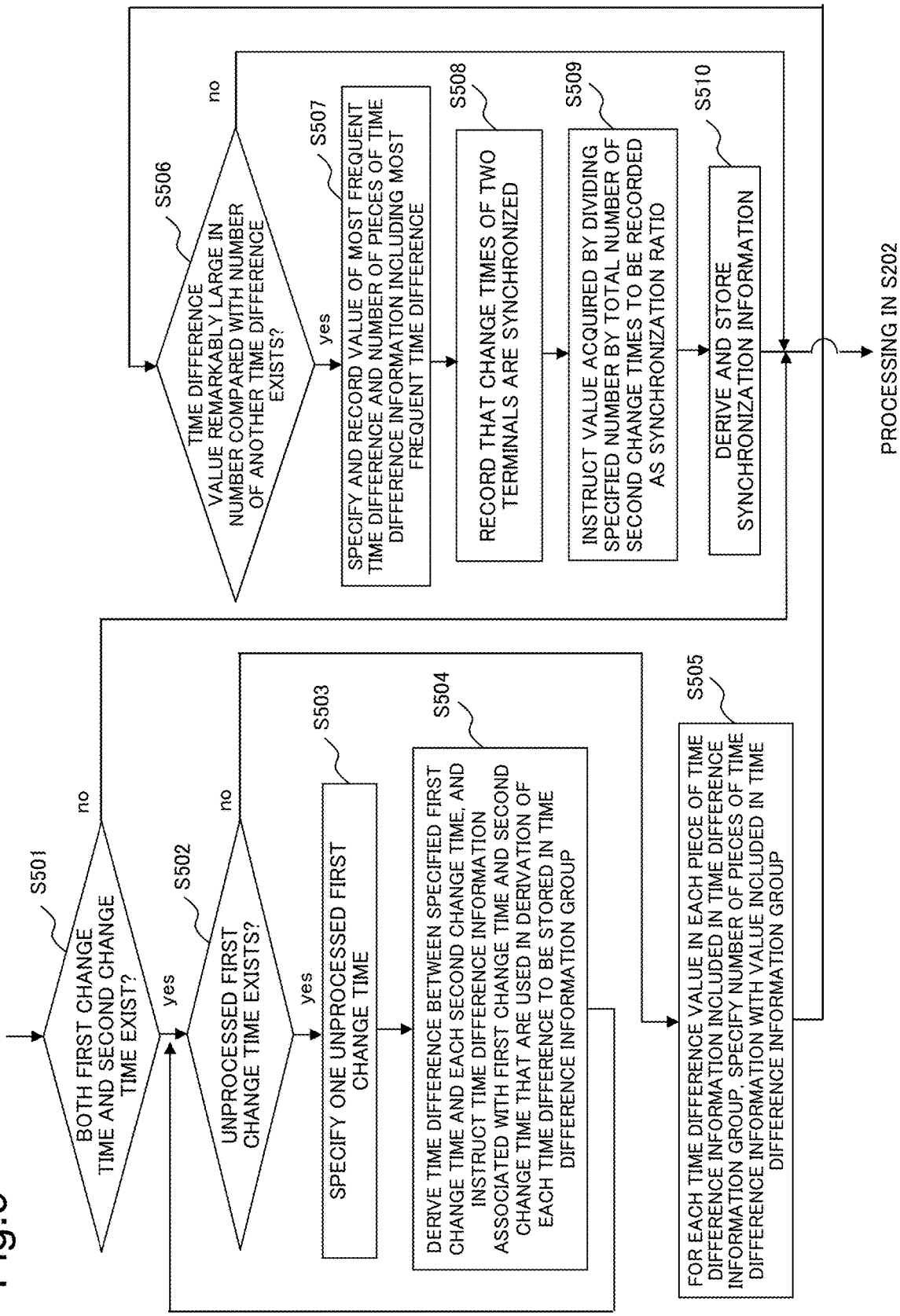
FIG. 9 is a conceptual diagram illustrating a processing flow example of processing in S208.

FIG. 9 is a conceptual diagram illustrating a processing flow example of the processing in S208 described in FIG. 8.

The derivation unit 104 performs processing in S501 after the processing in S207 described in FIG. 8.

When performing the processing in S501, the derivation unit 104 determines whether a first change time is specified by the most recent processing in S205 described in FIG. 8 and also whether a second change time is specified by the most recent processing in S207, as the processing.

When the determination result by the processing in S501 is yes, the derivation unit 104 performs processing in S502.

On the other hand, when the determination result by the processing in S501 is no, the derivation unit 104 performs the processing in S202 described in FIG. 8 again.

When performing the processing in S502, the derivation unit 104 determines whether a first change time not yet undergoing processing in S503 exists, as the processing.

When the determination result by the processing in S502 is yes, the derivation unit 104 performs the processing in S503.

On the other hand, when the determination result by the processing in S502 is no, the derivation unit 104 performs processing in S505.

When performing the processing in S503, the derivation unit 104 specifies one first change time not yet undergoing the processing, as the processing.

Then, as processing in S504, the derivation unit 104 derives a time difference being a difference between the first change time specified by the most recent processing in S503 and each of the second change times specified by the most recent processing in S207 described in FIG. 8. The derivation unit 104 generates time difference information by associating each derived time difference with the first change time and the second change time that are used for derivation of the time difference and causes the time difference information to be stored in an unillustrated time difference information group. At that time, when the recording unit 106 does not hold the time difference information group, the derivation unit 104 causes the recording unit 106 to generate a time difference information group with an empty content and to store each piece of the generated time difference information in the time difference information group.

Then, the derivation unit 104 performs the processing in S502 again.

When performing the processing in S505, for each time difference value in each piece of time difference information included in the time difference information group held by the recording unit 106 illustrated in FIG. 2, the derivation unit 104 counts the number of pieces of time difference information with the value included in the time difference information group, as the processing.

Then, as processing in S506, the derivation unit 104 determines whether a time difference value being remarkably large in number compared with other time difference values exists in the time difference values the numbers of which are counted by the processing in S505. For example, the derivation unit 104 makes the determination by deriving a deviation value of the number for each time difference value and determining whether a deviation value equal to or more than a predetermined threshold value Th3 exists.

When the determination result by the processing in S506 is yes, the derivation unit 104 performs processing in S507.

On the other hand, when the determination result by the processing in S506 is no, the derivation unit 104 performs the processing in S202 described in FIG. 8 again.

When performing the processing in S507, the derivation unit 104 specifies a value of the most frequent time difference being a value of a time difference being the largest in number and causes the recording unit 106 to record the value, as the processing. The derivation unit 104 also specifies the number of pieces of time difference information including the most frequent time difference and being included in the time difference information group held by the recording unit 106, and causes the recording unit 106 to hold the number, as the processing.

Next, as processing in S508, the derivation unit 104 causes the recording unit 106 to record information indicating that the first change time is synchronized with the second change time.

Next, as processing in S509, the derivation unit 104 derives, as a synchronization ratio, a value acquired by dividing the number specified by the most recent processing in S507 by the total number of the second change times specified by the most recent processing in S207 described in FIG. 8 and causes the recording unit 106 to record the value.

Then, as processing in S509, the derivation unit 104 determines the most frequent time difference derived by the most recent processing in S507 as the high-frequency time difference. Then, the derivation unit 104 generates the element information including the high-frequency time difference and the synchronization ratio derived by the most recent processing in S509. Then, the derivation unit 104 causes the synchronization information acquired by combining the element information with a terminal ID pair for the first terminal and the second terminal to be stored in the synchronization information group 202 illustrated in FIG. 2.

Then, the derivation unit 104 performs the processing in S202 described in FIG. 8.

Figure 10:
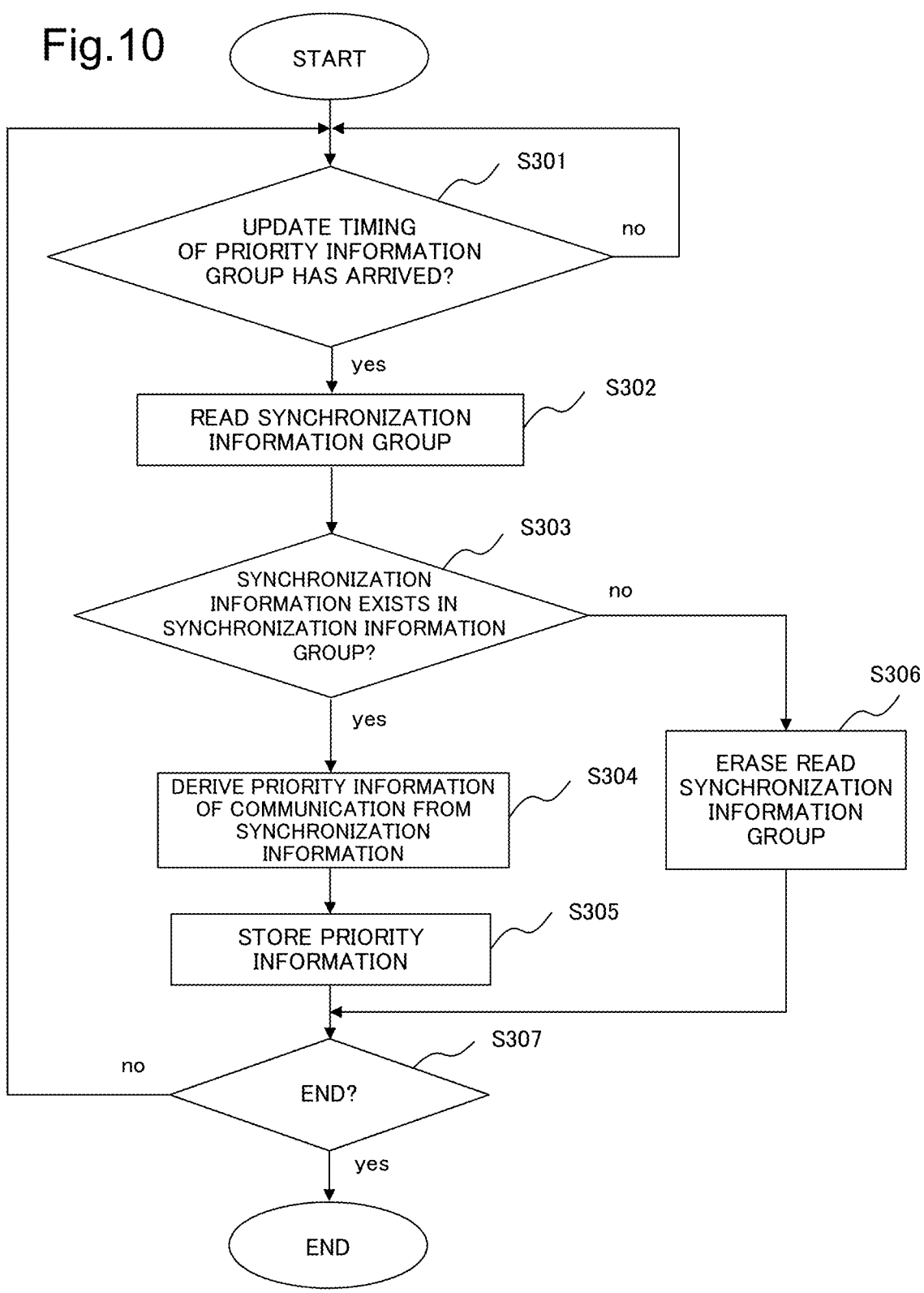
FIG. 10 is a conceptual diagram illustrating a processing flow example of update processing of a priority information group.

FIG. 10 is a conceptual diagram illustrating a processing flow example of update processing of the priority information group 204 illustrated in FIG. 2 performed by the communication control unit 105 illustrated in FIG. 2.

For example, the communication control unit 105 starts the processing illustrated in FIG. 10 by external input of start information.

Then, as processing in S301, the communication control unit 105 determines arrival of a timing for updating the priority information group 204. For example, the timing may be predetermined at equal time intervals. In that case, the communication control unit 105 determines arrival of the timing by use of a timer or the like. Alternatively, for example, the timing may be sent with using external notification information. In that case, the communication control unit 105 determines arrival of the timing by the notification information.

When the determination result by the processing in S301 is yes, the communication control unit 105 performs processing in S302.

On the other hand, when the determination result by the processing in S301 is no, the communication control unit 105 performs the processing in S301 again.

When performing the processing in S302, the communication control unit 105 reads the synchronization information group 202 from the recording unit 106 illustrated in FIG. 2, as the processing.

Then, as processing in S303, the communication control unit 105 determines whether synchronization information not yet undergoing processing in S304 exists in the synchronization information group read by the processing in S302.

When the determination result by the processing in S303 is yes, the communication control unit 105 performs processing in S304.

On the other hand, when the determination result by the processing in S303 is no, the communication control unit 105 performs processing in S306.

When performing the processing in S304, the communication control unit 105 derives the aforementioned priority information for each terminal from the synchronization information read by the processing in S302, as the processing.

Then, as processing in S305, the communication control unit 105 causes the priority information derived by the processing in S304 to be stored in the priority information group 204 illustrated in FIG. 2. When priority information for the terminal pair already exists, the communication control unit 105 replaces the priority information with the priority information derived by the processing in S304.

When performing the processing in S306, the communication control unit 105 erases the synchronization information group 202 read by the processing in S302, as the processing. Then, the communication control unit 105 performs processing in S307.

When performing the processing in S307, the communication control unit 105 determines whether to end the processing illustrated in FIG. 10, as the processing. For example, the communication control unit 105 makes the determination by determining existence of external input of end information.

When the determination result by the processing in S307 is yes, the communication control unit 105 ends the processing illustrated in FIG. 10.

On the other hand, when the determination result by the processing in S307 is no, the communication control unit 105 performs the processing in S301 again.

Figure 11:
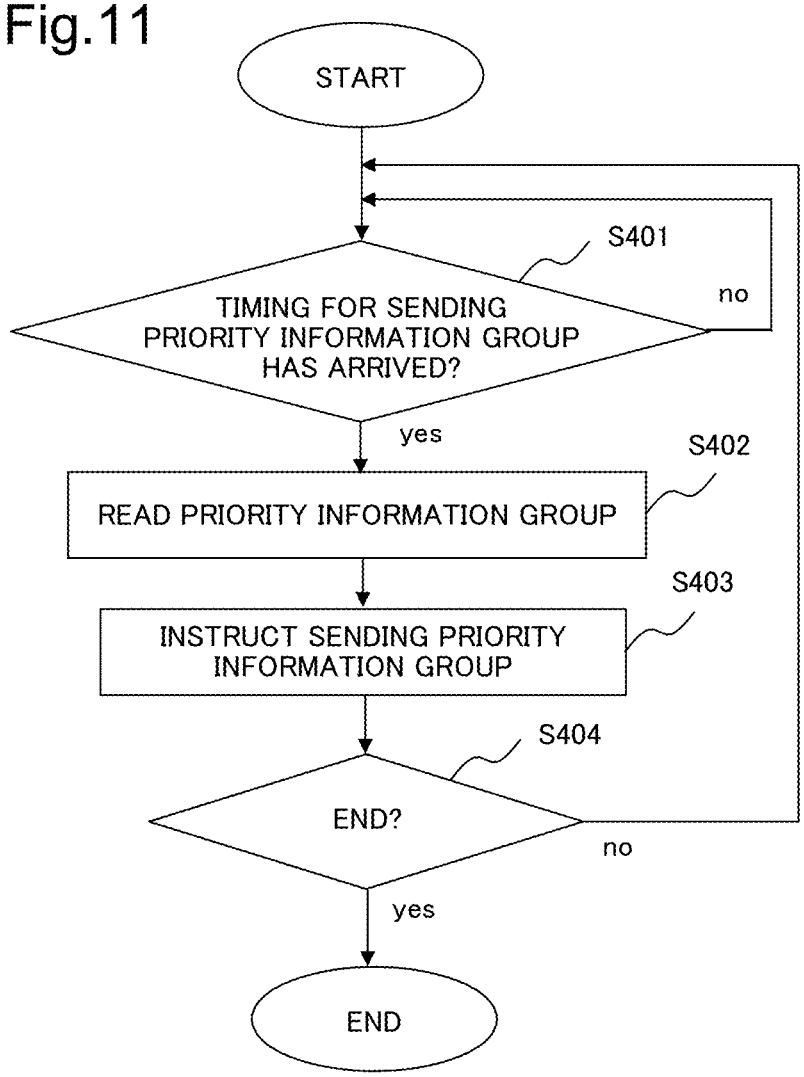
FIG. 11 is a conceptual diagram illustrating a processing flow example of sending processing of the priority information group to a base station.

FIG. 11 is a conceptual diagram illustrating a processing flow example of sending processing of the priority information group 204 illustrated in FIG. 2 to the base station 20 illustrated in FIG. 1 performed by the communication control unit 105.

For example, the communication control unit 105 starts the processing illustrated in FIG. 11 by external input of start information.

Then, as processing in S401, the communication control unit 105 determines arrival of a timing for updating the priority information group 204. For example, the timing may be predetermined at equal time intervals. In that case, the communication control unit 105 determines arrival of the timing by use of a timer or the like. Alternatively, for example, the timing may be sent with using external notification information. In that case, the communication control unit 105 determines arrival of the timing by the notification information.

When the determination result by the processing in S401 is yes, the communication control unit 105 performs processing in S402.

On the other hand, when the determination result by the processing in S401 is no, the communication control unit 105 performs the processing in S401 again.

When performing the processing in S402, the communication control unit 105 reads the priority information group 204 from the recording unit 106 illustrated in FIG. 2, as the processing.

Then, as processing in S403, the communication control unit 105 causes the communication processing unit 101 illustrated in FIG. 2 to send the priority information group 204 read by the processing in S402 to the base station 20.

Then, as processing in S404, the communication control unit 105 determines whether to end the processing illustrated in FIG. 11. For example, the communication control unit 105 makes the determination by determining existence of external input of end information.

When the determination result by the processing in S404 is yes, the communication control unit 105 ends the processing illustrated in FIG. 11.

On the other hand, when the determination result by the processing in S404 is no, the communication control unit 105 performs processing in S401.

Specific Example

Next, a specific example of the operation performed by the communication device 10 in accordance with the processing flow described above will be described.

The communication processing unit 101 in the communication device 10 monitors a communication between an information processing terminal and the server device 40, and stands by until a new packet is received (S101 in FIG. 7). When a new packet is not received (no in S101), the communication processing unit 101 continues to stand by until a new packet is received again (S101).

When determining that a new packet is received (yes in S101), the communication processing unit 101 receives the packet and generates communication information from the received packet (S102).

For example, the communication information is a set of a reception time of the packet, a source address, a destination port, a destination address, a destination port, and the packet size, as illustrated in FIG. 5. It is assumed here that the time at which the packet is observed is "13:01:35.342," the source address is "10.0.0.2," the source port is "23989," the destination address is "10.1.1.1," the destination port is "443," and the packet size is "520." In that case, the communication information is (13:01:35.342, 10.0.0.2, 23989, 10.1.1.1, 443, 520).

Next, the communication processing unit 101 causes the generated communication information to be stored (S103). When already causing the communication information group 201 to be held in the recording unit 106 as a table, the communication processing unit 101 adds the newly generated communication information (13:01:35.342, 10.0.0.2, 23989, 10.1.1.1, 443, 520) to the last row of the table. The communication information group 201 in that case may be a table as illustrated in FIG. 12.

Subsequently, the communication processing unit 101 transfers the received packet to a destination included in the packet (S105).

The communication processing unit 101 repeats the processing in S101 to S107 excluding the case of ending the process (yes in S107).

On the other hand, the derivation unit 104 selects a terminal pair (S201, yes in S202, and S203 described in FIG. 8). The selected terminals are terminals included in communication information stored in the communication information group 201 illustrated in FIG. 2.

For example, it is assumed that a terminal has an IP address in a range from "10.0.0.1" to "10.0.0.254." In that case, the derivation unit 104 selects two IP addresses from source addresses and destination addresses that are included in the communication information stored in the communication information group 201 out of any IP addresses in the range. It is assumed here that the derivation unit 104 selects "10.0.0.1" and "10.0.0.2" that are IP addresses of the terminals 30-1 and 30-2, respectively. It is assumed that an IP address range of a terminal is preset in the derivation unit 104 by an administrator of the communication device 10.

Next, the derivation unit 104 refers to communication state information included in the communication state information group 203 held by the recording unit 106. Then, the derivation unit 104 extracts a part of the communication state information associated with "10.0.0.1" being an IP address of 30-1 being a first terminal specified by the processing in S203, the part being related to the most recent predetermined time range.

The derivation unit 104 specifies a time at which a communication state of the selected first terminal changes in the extracted communication state information (S205).

The following description assumes that the derivation unit 104 uses whether the terminal 30-1 is in a communication state as a communication state of the terminal 30-1.

Figure 13:
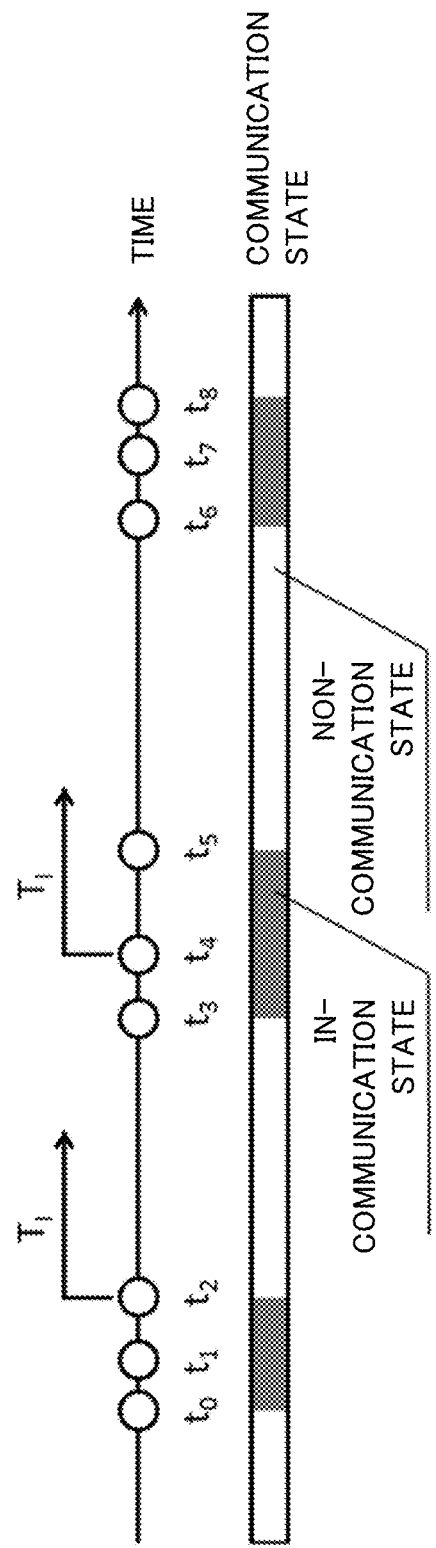
FIG. 13 is an image diagram illustrating part of communication state information.

FIG. 13 is an image diagram illustrating part of the communication state information of the terminal 30-1 read by the processing in S204 described in FIG. 8.

When communication is not performed for a predetermined time T1 from a packet reception time (for example, t2), the derivation unit 104 determines that a transition is made from an in-communication state to a non-communication state at the reception time. The derivation unit 104 detects a transition from the non-communication state to the in-communication state by use of, for example, a timer and determines that a packet is not received for the time T1 from the packet reception time.

The derivation unit 104 also determines a time (for example, t3 in FIG. 13) at which communication is first performed in the non-communication state as a time at which a transition is made from the non-communication state to the in-communication state.

When receiving another packet before the time T1 elapses after the packet reception time for the terminal 30-1 (for example, t4 and t5 in FIG. 13), the derivation unit 104 determines that the in-communication state is continuing.

The reason the derivation unit 104 makes a determination as described above is that, when a terminal transmits a piece of information, a plurality of times of packet exchange for establishment of a connection, exchange of authentication information, and the like are performed with the server device 40 in a short period of time. In such a case, a change in a communication state can be more precisely determined by determining that a communication continues during a communication accompanying information transmission.

In the processing in S205, the derivation unit 104 specifies times (t0, t3, t6, . . . ) when the non-communication state changes to the in-communication state as the aforementioned change times.

Next, the derivation unit 104 performs the processing in S206 and S207 being processing similar to the processing in S204 and S205 on the terminal 30-2 being a second terminal specified by the processing in S203. Then, the derivation unit 104 specifies t'0, t'1, t'2, . . . as the change times of the terminal 30-2.

Next, based on the change times specified by the processing in S205 and S207, the derivation unit 104 determines whether a communication change of the first terminal is synchronized with a change time of the second terminal (S208).

The derivation unit 104 makes the determination as follows.

First, the derivation unit 104 selects one change time of the terminal 30-1 (yes in S501, yes in S502, and S503 in FIG. 9). It is assumed here that the selected time is the time t0.

Then, the derivation unit 104 calculates a time difference between the time to and each change time of the terminal 30-2 (S504). It is assumed that the times calculated by the derivation unit 104 are t'0-t0, t'1-t0, . . . .

Figure 14:
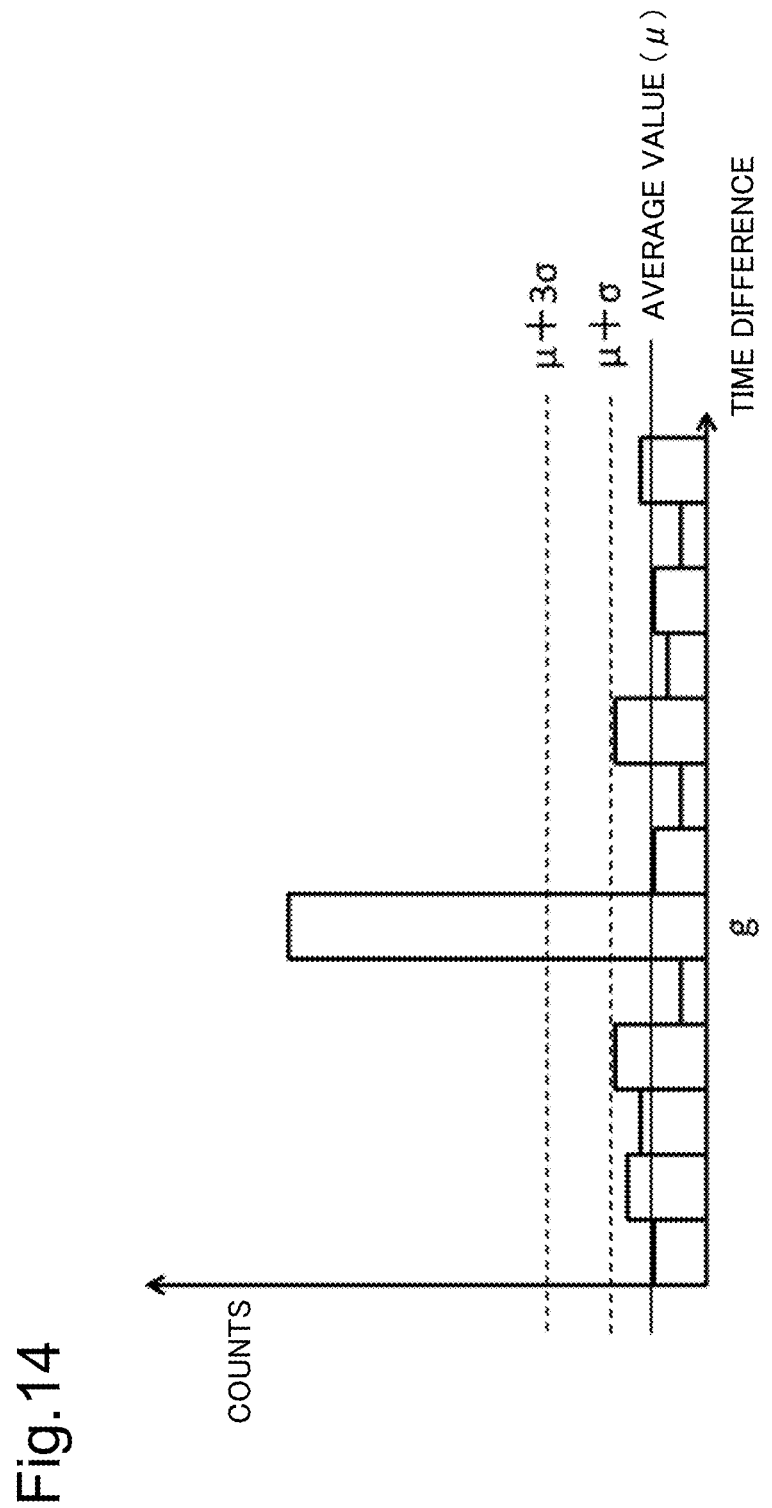
FIG. 14 is a diagram illustrating an example of a histogram of derived time differences.

Then, the derivation unit 104 similarly calculates time differences between change times of the terminal 30-1 other than the time t0 and the change times of the terminal 30-2 (yes in S502, S503, and S504). Then, the derivation unit 104 derives a histogram of the calculated time differences (S505). For example, the histogram may be a histogram as illustrated in FIG. 14.

Next, the derivation unit 104 refers to the derived histogram and determines whether a time difference the count of which is remarkably high compared with other time differences exists. Denoting an average and a standard deviation of counts as µ and σ, respectively, the derivation unit 104, for example, determines whether a time difference the count of which is equal to or more than µ+3σ exists (S506 in FIG. 9).

Then, when determining that a time difference the count of which is remarkably high compared with other time differences exists (yes in S506), the derivation unit 104 determines that communication state changes of the terminal 30-1 and the terminal 30-2 are synchronized (S508). In the histogram illustrated in FIG. 14, the count of a time difference g may be determined to be remarkably high compared with other time differences. Accordingly, the derivation unit 104 determines that change times of the terminal 30-1 and the terminal 30-2 are synchronized (S508).

The derivation unit 104 further calculates synchronization information about the two selected terminals (S507 to S510). What the derivation unit 104 calculates are a time difference and a synchronization ratio of communication state changes occurring in a synchronized manner between the terminals 30-1 and 30-2.

The derivation unit 104 may determine a time difference of communication state changes from the histogram illustrated in FIG. 14. A time difference with the highest count in the histogram illustrated in FIG. 14 is the time difference g. Accordingly, the derivation unit 104 determines the time difference g to be a high-frequency time difference to be included in the synchronization information.

On the other hand, by use of the total number N1 of the change times of the first terminal and a synchronization count NC of the change times of the first and second terminals, the synchronization ratio is calculated by synchronization count NC/total number N1 (S509 and S510). It is assumed that the synchronization count NC is the count of the time difference g according to the histogram in FIG. 12.

The aforementioned derivation method of synchronization information is merely an example, and the derivation unit 104 may derive synchronization information by use of another method. For example, the derivation unit 104 may calculate the synchronization count NC by subtracting the average value µ of counts of the other time differences in the histogram from the count at the position of the time difference g in the histogram. Thus, the derivation unit 104 can yet more precisely calculate a synchronization probability. When a plurality of times exist, the derivation unit 104 may derive a plurality of pieces of high-frequency time difference information.

Next, the derivation unit 104 stores the derived synchronization information into the synchronization information group 202 (S510 in FIG. 9). When the change times of the terminals 30-1 and 30-2 respectively having terminal IDs 10.0.0.1 and 10.0.0.2 are synchronized with a time difference of 10 seconds with a probability of 0.7, the derivation unit 104 stores the aforementioned synchronization information 206a described in FIG. 6 into the synchronization information group 202.

Subsequently, the derivation unit 104 determines whether another combination of terminals exists (S202 in FIG. 8). When another combination of terminals does not exist (no in S202), the derivation unit 104 ends the processing (S211 and yes in S212).

When another combination of terminals exists (yes in S202), the derivation unit 104 newly specifies a combination of terminals unselected by the communication processing unit 101 (S203) and thereafter repeats the processing in and after S204.

When communication state changes of the selected first and second terminals are determined to be not synchronized (no in S506 in FIG. 9), the processing moves to S202 in FIG. 8, and the processing in and after S202 is executed.

A communication device according to the present example embodiment performs communication control, based on communication state changes being synchronized between a plurality of information processing terminals with a time difference. More specifically, with regard to information processing terminals for sensing, such as a camera and a sensor, a plurality of the information processing terminals are often installed at different locations in a neighborhood. When a change in a sensing target (for example, passage of a person) is detected, a change in a communication state of the equipment, such as increase of an amount of transmitted data, occurs. Such communication state changes occur between a plurality of pieces of equipment in a synchronized manner with a certain time difference, following a positional change of the sensing target (for example, movement of a person). Analysis of a synchronization relation of communication state changes between a plurality of information processing devices allows prediction that a communication for detection of a change in the sensing target is performed in the near future. When a communication state changes accompanying detection of a change in the sensing target (such as passage of a person) in a first information processing terminal, the communication is performed in another information processing terminal in a synchronization relation.

As described above, a communication accompanying a change in a sensing target has higher importance than other communications, and a communication with higher importance can be preferentially performed by performing communication control in such a way that a wireless resource is preferentially allocated to the terminal 30-2, based on prediction.

Advantageous Effects

The communication device according to the present example embodiment monitors a communication state of a communication performed by each terminal with a server through a base station. The communication being a monitor target includes both an upstream direction and a downstream direction. Then, when change times related to the terminal pair are synchronized, the communication device derives the high-frequency time difference between the synchronized change times for the terminal pair. The change time refers to a time at which a communication state related to communications in an upstream direction and a downstream direction for each terminal changes. It is assumed here that the change time of a second terminal is mostly synchronized with the change time of a first terminal but is behind by a high-frequency time difference. In that case, when performing communication processing on a packet related to the first terminal, the communication device causes the base station to secure a communication resource for performing communication processing on a packet related to the second terminal when the high-frequency time difference elapses after the processing time. When the base station secures a required communication resource, communication quality is enhanced. A communication resource is also secured for a communication in an upstream direction from the terminal.

Accordingly, the communication device may improve communication quality of a communication in the upstream direction from the terminal.

Second Example Embodiment

A second example embodiment is an example embodiment related to a communication device making a determination about existence of synchronization with respect to a terminal pair communication state changes of which are highly likely to be synchronized.

Configuration and Operation

Figure 15:
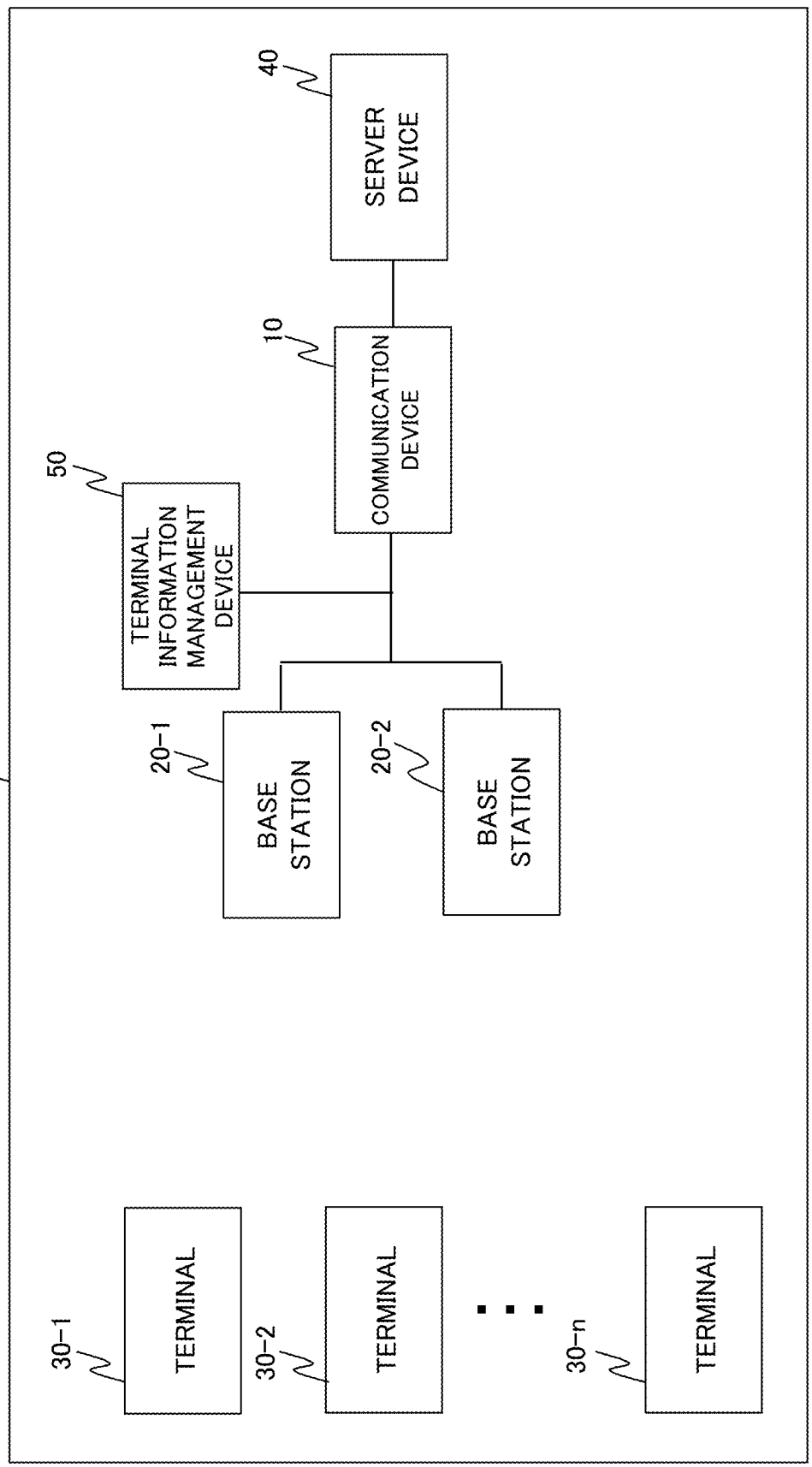
FIG. 15 is a conceptual diagram illustrating a configuration example of a communication system according to a second example embodiment.

FIG. 15 is a conceptual diagram illustrating a configuration of a communication system 100 being an example of a communication system according to the second example embodiment.

The communication system 100 includes a communication device 10, base stations 20-1 and 20-2, a server device 40, a terminal information management device 50, and terminals 30-1 to 30-n being n terminals.

The communication system 100 differs from the communication system 100 illustrated in FIG. 1 in that the terminal information management device 50 is added, and the base station 20 is replaced by the base stations 20-1 and 20-2.

Each of the base stations 20-1 and 20-2 may be hereinafter simply referred to as a base station.

The communication device 10 monitors and analyzes a communication between an information processing terminal and the server device 40, and sends priority information of each terminal to either base station.

The terminal information management device 50 manages terminal information being information about a terminal. The terminal information management device 50 sends the terminal information to the communication device 10 in accordance with a request from the communication device 10.

The terminal information includes a terminal ID for uniquely identifying a terminal, and determination basis information. The determination basis information is information that may be a basis for determining whether communication states of the specified terminal pair are highly likely to be synchronized.

For example, the determination basis information is a base station ID for uniquely identifying a base station connected to a terminal. Terminals connected to an identical base station are closely positioned, and therefore it is highly likely that communication states change in synchronization with each other accompanying a movement or the like of a sensing target such as a person. Consequently, a base station ID is included in the determination basis information that may be a basis for determining whether communication states of the specified terminal pair are highly likely to be synchronized.

A base station sends a packet sent from the server device 40 to a destination terminal included in the packet. A base station also sends a packet sent from a terminal to the server device 40.

Excluding the above, the description of the communication system 100 is the same as the description of the communication system 100 according to the first example embodiment illustrated in FIG. 1. However, the base station 20 is read as a base station in the description of the communication system 100 according to the first example embodiment. When the description of the first example embodiment is inconsistent with the above description, the above description has priority.

A configuration example of the communication device according to the second example embodiment illustrated in FIG. 15 is the same as the configuration of the communication device 10a illustrated in FIG. 2.

However, a description of the communication device 10a according to the second example embodiment illustrated in FIG. 2 differs from the description of the communication device 10a according to the first example embodiment in the following point. The difference between the description of the communication device 10a according to the first example embodiment and the description of a communication device 10a according to the second example embodiment will be mainly described below.

A communication processing unit 101 according to the second example embodiment requests terminal information about a terminal from the terminal information management device 50 illustrated in FIG. 1, in accordance with an instruction from a derivation unit 104. When requesting terminal information about the terminal 30-1, the communication processing unit 101 for example, sends a terminal information acquisition request including a terminal ID of the terminal 30-1 to the terminal information management device 50.

For example, the terminal information acquisition request is transmitted by an HTTP GET request specifying "http://10.2.0.1/30-1/" as a URL. Note that "10.2.0.1" is an IP address of the terminal information management device 50, and "30-1" is a terminal ID of the terminal 30-1.

The terminal information management device 50 illustrated in FIG. 15 receiving the terminal information acquisition request sends a base station ID of a base station 20 connected to the terminal 30-1 to the communication processing unit 101. For example, the terminal information management device 50 describes "20-1" being the base station ID of the base station 20-1 in the body of an HTTP 200 OK response and sends the response to the communication processing unit 101. The acquisition method of terminal information described herein is merely an example, and the communication processing unit 101 may acquire terminal information from the terminal information management device 50 by another method. For example, the terminal information management device 50 and the communication processing unit 101 may give and receive terminal information by a method conforming to another protocol such as the Diameter protocol. The terminal ID and the base station ID may have other formats.

The communication processing unit 101 sends the acquired terminal information to the derivation unit 104.

Based on the terminal information sent from the communication processing unit 101, the derivation unit 104 selects a terminal ID pair described in the first example embodiment. For example, the derivation unit 104 generates a terminal ID pair for terminals connected to an identical base station, based on the terminal information.

Terminals connected to an identical base station are closely positioned, and therefore it is highly likely that communication states change in synchronization with each other accompanying a movement or the like of a sensing target such as a person. Accordingly, by selecting a set of terminals connected to an identical base station by the derivation unit 104, a combination of terminal IDs the change times of which are highly likely to be synchronized, the combination being described in the first example embodiment, can be determined as the terminal ID pair.

Excluding the above, the description of the communication device 10a according to the second example embodiment illustrated in FIG. 2 is the same as the description of the communication device 10a according to the first example embodiment illustrated in FIG. 2. When the above description is inconsistent with the description of the first example embodiment, the above description has priority.

Figure 16:
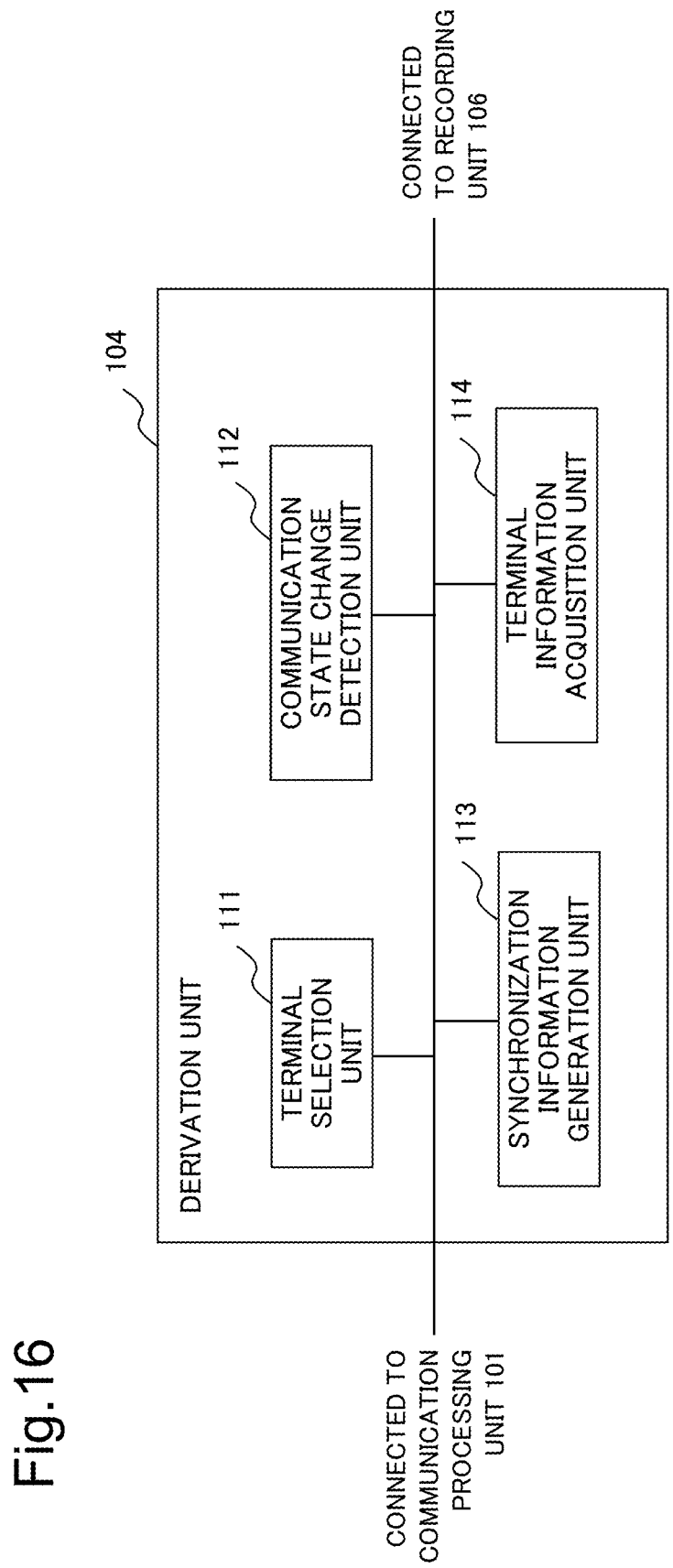
FIG. 16 is a conceptual diagram illustrating a configuration example of a derivation unit according to the second example embodiment.

FIG. 16 is a conceptual diagram illustrating a configuration example of the derivation unit 104 according to the second example embodiment illustrated in FIG. 2.

The derivation unit 104 illustrated in FIG. 16 includes a terminal information acquisition unit 114 in addition to the configuration included in the derivation unit 104 according to the first example embodiment illustrated in FIG. 5.

The terminal information acquisition unit 114 performs a part related to acquisition of the terminal information in the operation performed by the aforementioned derivation unit 104 according to the second example embodiment illustrated in FIG. 2.

The description of the derivation unit 104 illustrated in FIG. 16 other than the above is the same as the description of the derivation unit 104 according to the first example embodiment illustrated in FIG. 5. When the description of the first example embodiment is inconsistent with the above description, the above description has priority.

Processing Flow Example

Figure 17:
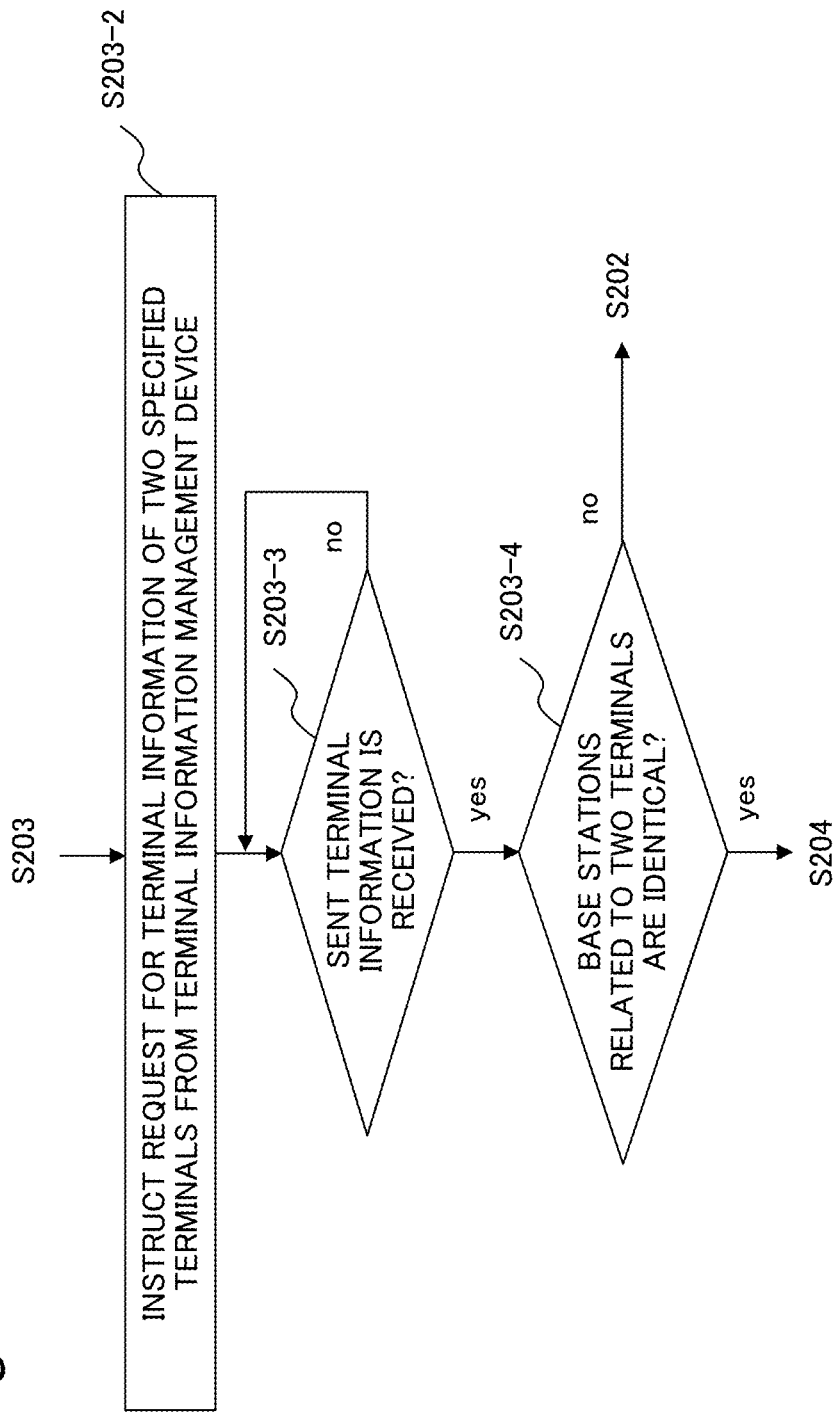
FIG. 17 is a conceptual diagram illustrating inserted processing.

Processing performed by the derivation unit 104 according to the second example embodiment illustrated in FIG. 2 is acquired by inserting processing illustrated in FIG. 17 between the processing in S203 and the processing in S204 in the processing performed by the derivation unit 104 according to the first example embodiment illustrated in FIG. 8. FIG. 17 is a conceptual diagram illustrating the inserted processing.

Following the processing in S203 described in FIG. 8, as processing in S203-2, the derivation unit 104 according to the second example embodiment causes the communication processing unit 101 to request terminal information of each terminal in the terminal pair specified by the most recent processing in S203 from the terminal information management device 50 illustrated in FIG. 15.

Then, as processing in S203-3, the derivation unit 104 determines whether terminal information sent from the terminal information management device 50 is received.

When the determination result by the processing in S203-3 is yes, the derivation unit 104 performs processing in S203-4.

On the other hand, when the determination result by S203-3 is no, the derivation unit 104 performs the processing in S203-3 again.

When performing the processing in S203-4, the derivation unit 104 determines whether base station IDs included in the received pieces of terminal information sent from the terminal information management device 50 are the same for the terminal pair specified by the processing in S203.

When the determination result by the processing in S203-4 is yes, the derivation unit 104 performs the processing in S204 described in FIG. 8.

On the other hand, when the determination result by the processing in S203-4 is no, the derivation unit 104 performs the processing in S202 described in FIG. 8.

Excluding the above, the processing flow example of the processing performed by the derivation unit 104 according to the second example embodiment is the same as the processing flow example of the processing performed by the derivation unit 104 according to the first example embodiment illustrated in FIG. 8. When the above description is different from the description of the first example embodiment, the above description has priority.

Specific Example

Next, a specific example of the operation of specifying the terminal pair performed by the derivation unit 104 according to the second example embodiment will be described.

First, the derivation unit 104 specifies the terminal pair from terminals included in the communication information group 201 held by the recording unit 106 illustrated in FIG. 2 (yes in S202 and S203 in FIG. 8). The following description assumes that the derivation unit 104 specifies the terminals 30-1 and 30-2.

The derivation unit 104 causes the communication processing unit 101 to acquire terminal information of each of the terminals 30-1 and 30-2 from the terminal information management device 50 illustrated in FIG. 15 (S203-2 and yes in S203-3 in FIG. 17).

Specifically, the derivation unit 104 causes the communication processing unit 101 to send a terminal information acquisition request specifying terminal IDs of the terminals 30-1 and 30-2 to the terminal information management device 50 (S203-2 in FIG. 17). The terminal information management device 50 returns terminal information of a terminal related to the terminal ID specified in the received terminal information request to the communication processing unit 101. The terminal information includes a base station ID of a base station connected to the terminal. The terminal information is sent to the derivation unit 104.

The following description assumes that both the terminals 30-1 and 30-2 are connected to the base station 20-1, and two pieces of terminal information including the base station ID of the base station 20-1 are returned to the communication processing unit 101.

The derivation unit 104 determines that the base station IDs included in the pieces of terminal information related to the respective terminals in the terminal pair selected based on the acquired terminal information are identical (yes in S203-4).

Then, the derivation unit 104 performs the processing in and after the processing in S204 described in FIG. 8.

A case of the determination basis information being a base station ID connected to each terminal has been mainly described with regard to the communication device according to the second example embodiment described above. However, the determination basis information is not limited to a base station ID connected to a terminal. The determination basis information may be any information allowing derivation of communication state changes being highly likely to be synchronized for the specific terminal pair.

For example, a base station existing within a predetermined distance from terminals connected to the base station may be determined as the determination basis information. The reason is that a probability of communication state changes of a terminal pair being synchronized increases by a base station connected to each terminal in the terminal pair being closely positioned.

Advantageous Effects

The communication device according to the second example embodiment has a configuration similar to that of the communication device according to the first example embodiment and provides an effect similar to that of the communication device according to the first example embodiment.

The communication device according to the second example embodiment selects the terminal pair, communication state changes of the terminal pair being highly likely to be synchronized being derived from the determination basis information, and determines whether communication state changes are synchronized for the terminals.

Accordingly, the communication device can avoid making an unnecessary determination about whether communication state changes are synchronized for a terminal pair communication states of which are less likely to be synchronized. Further, the communication device enables reduction of a probability of mistakenly determining a terminal pair communication state changes of which are similar by coincidence and are not actually synchronized to be a terminal pair communication state changes of which are synchronized.

Third Example Embodiment

In the communication systems according to the first example embodiment and the second example embodiment, a communication device sends a communication priority of an information processing terminal to a base station, and the base station performs communication control of a communication related to each terminal, based on the notification. On the other hand, in a communication system according to a third example embodiment, a communication device performs communication control of a communication related to a terminal.

Configuration and Operation

A configuration example of the communication system according to the third example embodiment is the same as the configuration of the communication system 100 according to the first example embodiment illustrated in FIG. 1.

However, a communication device 10 in a communication system 100 according to the third example embodiment illustrated in FIG. 1 performs the aforementioned communication control on each terminal, based on the aforementioned priority information derived by the communication device 10. Details of the communication control will be described later.

The communication system 100 illustrated in FIG. 1 is merely an example illustrating the communication system according to the third example embodiment, and the communication system according to the third example embodiment may have another configuration. For example, the communication system 100 may include a plurality of base stations 20 and/or server devices 40.

A configuration example of the communication device according to the third example embodiment illustrated in FIG. 1 is the same as that of the communication device 10a according to the first example embodiment illustrated in FIG. 2. However, the description of the communication device 10a according to the third example embodiment illustrated in FIG. 2 differs from the description of the communication device 10a according to the first example embodiment in the following point.

A communication control unit 105 according to the third example embodiment derives a communication priority of a terminal, similarly to the communication control unit 105 according to the first example embodiment. Then, the communication control unit 105 according to the third example embodiment causes priority information generated from the communication priority to be stored in a priority information group 204 illustrated in FIG. 2. For example, the priority information includes delay information for causing a delay in data related to terminals other than a terminal having priority for communication.

For example, the delay information is information indicating a delay time d by which confirmation responses for terminals other than a terminal having priority for communication are delayed.

In TCP being a protocol normally used in the Internet, when data are transmitted from a terminal to the server device 40, a confirmation response indicating arrival of the data is returned from the server device 40 to the terminal. After receiving the confirmation response, the terminal transmits subsequent data to the server device 40. Accordingly, a communication processing unit 101 can cause a delay in communication data transmitted from the terminal, by delaying transfer of a confirmation response transmitted from the server device 40 to the terminal.

When the priority information includes a delay time Td as the delay information, the communication control unit 105 causes a recording unit 106 to hold a combination of the delay time Td and a terminal ID of a terminal to be delayed as the priority information.

In accordance with the priority information read from the recording unit 106, the communication processing unit 101 delays communication data between terminals other than a terminal having priority for communication and the server device 40.

When the priority information is a delay time d, the communication processing unit 101 causes a delay based on the delay time d in a communication related to a terminal other than the terminal being a target of preference.

Figure 18:
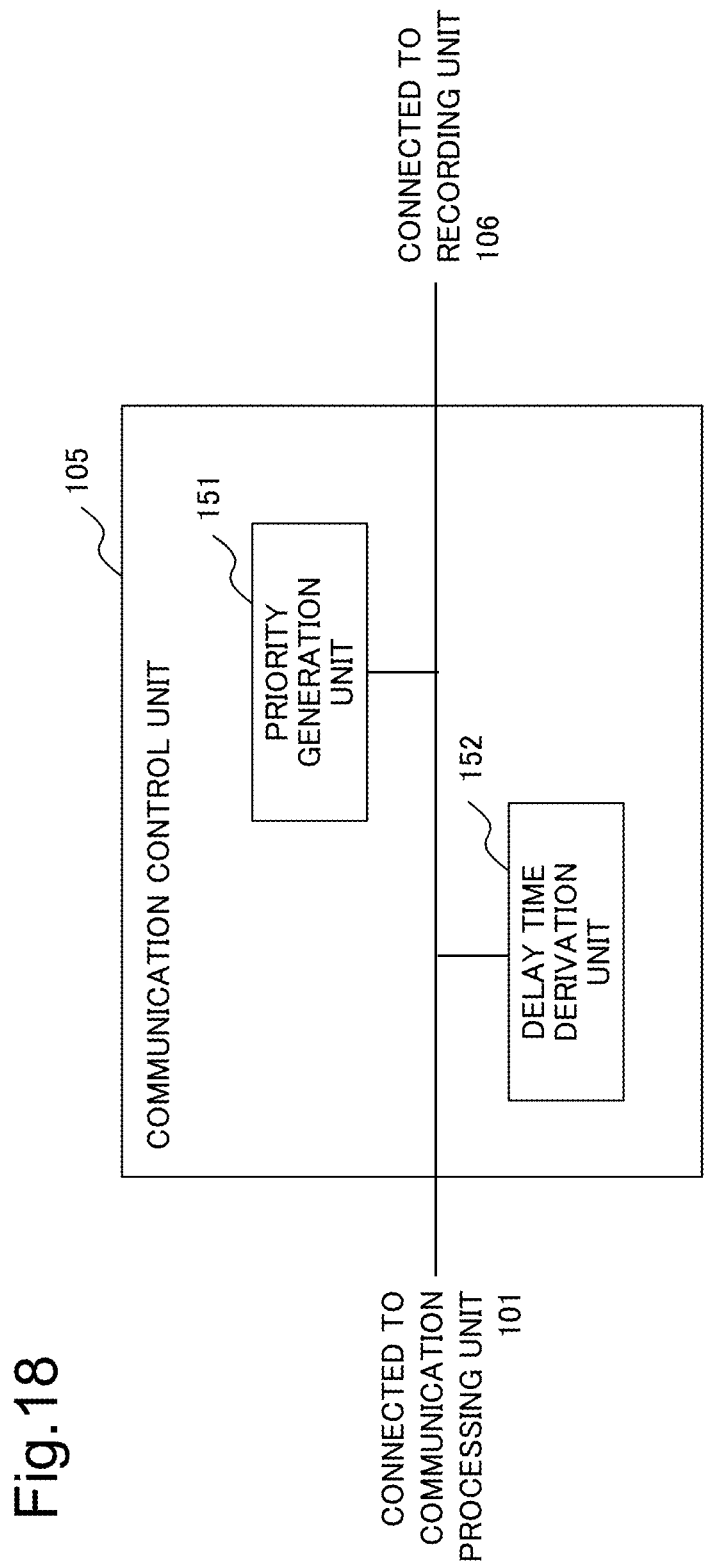
FIG. 18 is a conceptual diagram illustrating a configuration example of a communication control unit according to a third example embodiment.

FIG. 18 is a conceptual diagram illustrating a configuration example of the communication control unit 105 according to the third example embodiment illustrated in FIG. 2.

The communication control unit 105 illustrated in FIG. 18 includes a delay time derivation unit 152 in addition to the configuration included in the communication control unit 105 according to the first example embodiment illustrated in FIG. 4.

The delay time derivation unit 152 performs the aforementioned delay time derivation operation performed by the communication control unit 105.

Excluding the above, the description of the communication control unit 105 illustrated in FIG. 18 is the same as the description of communication control unit 105 according to the first example embodiment illustrated in FIG. 4. When the above description is inconsistent with the description of the first example embodiment, the above description has priority.

Processing Flow Example

Figure 19:
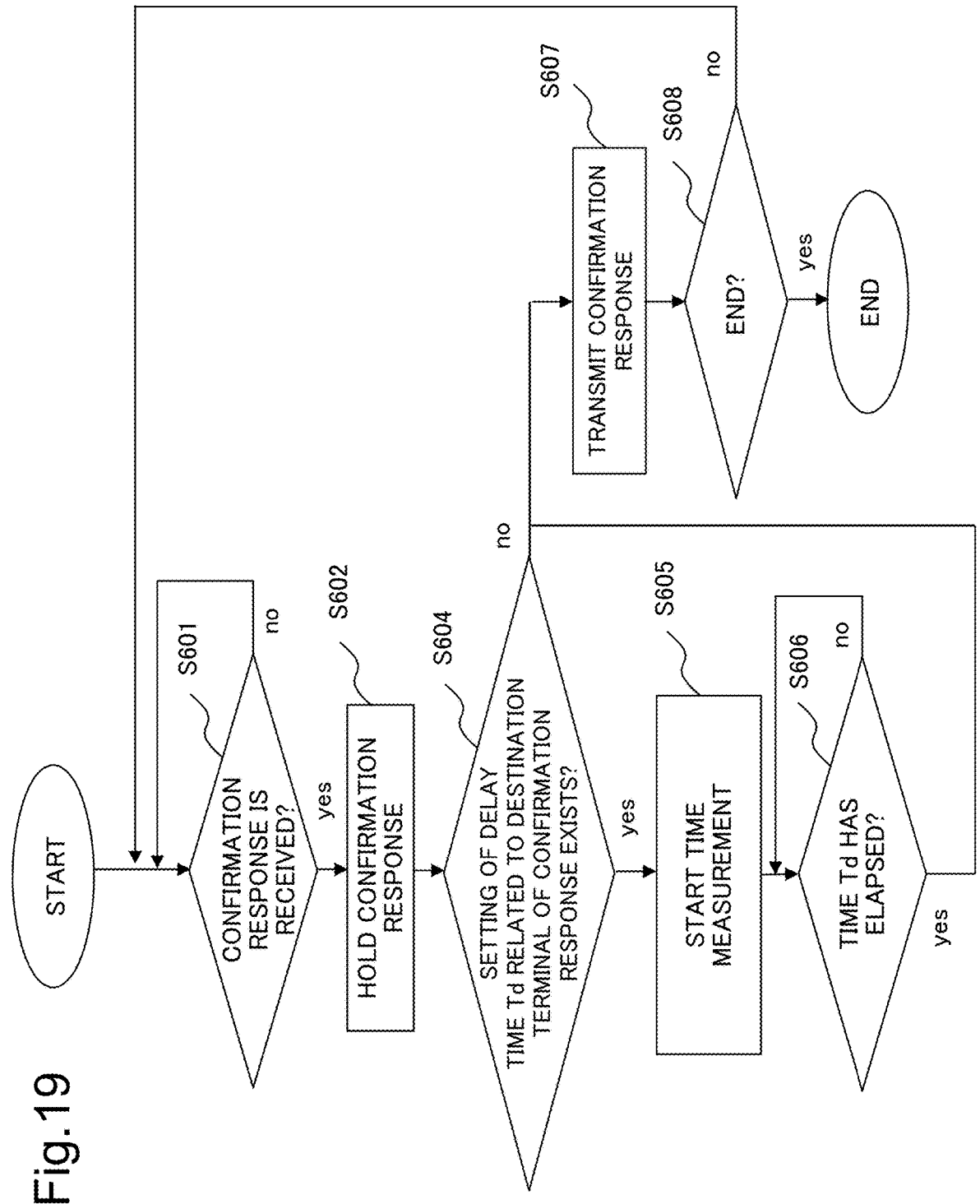
FIG. 19 is a conceptual diagram illustrating a processing flow example of transfer processing of a confirmation response performed by a communication processing unit according to the third example embodiment.

FIG. 19 is a conceptual diagram illustrating a processing flow example of transfer processing of a confirmation response performed by the communication processing unit 101 according to the third example embodiment illustrated in FIG. 2.

For example, the communication processing unit 101 starts the processing illustrated in FIG. 19 by external input of start information.

Then, as processing in S601, the communication processing unit 101 determines whether a confirmation response is received from the server device 40.

When the determination result by the processing in S601 is yes, the communication processing unit 101 performs processing in S602.

On the other hand, when the determination result by the processing in S601 is no, the communication processing unit 101 performs the processing in S601 again.

When performing the processing in S602, the communication processing unit 101 holds the confirmation response reception of which is determined by the processing in S601, as the processing. It is assumed here that the communication processing unit 101 includes a holding unit capable of holding a confirmation response differently from other packets.

Then, as processing in S604, the communication processing unit 101 determines whether the recording unit 106 illustrated in FIG. 2 holds a delay time Td a target of which is a destination terminal of the confirmation response held by the processing in S602.

When the determination result by the processing in S604 is yes, the communication processing unit 101 performs processing in S605.

On the other hand, when the determination result by the processing in S604 is no, the communication processing unit 101 performs processing in S607.

When performing the processing in S605, the communication processing unit 101 starts a time measurement, as the processing. It is assumed here that the communication processing unit 101 may use a timer.

Then, as processing in S606, the communication processing unit 101 determines whether the delay time Td has elapsed since the time measurement is started by the processing in S605.

When the determination result by the processing in S606 is yes, the communication processing unit 101 performs the processing in S607.

On the other hand, when the determination result by the processing in S606 is no, the communication processing unit 101 performs the processing in S606 again.

When performing the processing in S607, the communication processing unit 101 transmits a confirmation response held by the most recent processing in S602 to a destination terminal of the confirmation response, as the processing.

Then, as processing in S608, the communication processing unit 101 determines whether to end the processing illustrated in FIG. 19. For example, the communication processing unit 101 makes the determination by determining existence of external input of end information.

When the determination result by the processing in S608 is yes, the communication processing unit 101 ends the processing illustrated in FIG. 19.

On the other hand, when the determination result by the processing in S606 is no, the communication processing unit 101 performs the processing in S601 again.

Specific Example

Next, a specific example of the operation of the communication device 10 according to the third example embodiment will be described.

First, the communication processing unit 101 receives a confirmation response transmitted from the server device 40 to a terminal (yes in S601). It is assumed here that the received confirmation response is addressed to the terminal 30-1.

Next, the communication processing unit 101 determines whether a setting of a delay time Td exists for the terminal 30-1 being the destination terminal of the received confirmation response (S604).

It is assumed that the delay time Td is derived from a communication priority and is set in association with a terminal. For example, when a communication priority is 1 meaning normal, for example, a delay time of 10 ms is set. When the communication priority is more than 1, for example, 0 is set as the delay time Td. The derivation method of a delay time is merely an example and may be another method.

When determining that a setting of the delay time Td does not exist (no in S604), the communication processing unit 101 transmits the confirmation response without delay (S607). On the other hand, when determining that a setting of the delay time Td exists (yes in S604), the communication processing unit 101 performs communication control (yes in S604 and S605 to S607).

Specifically, the communication processing unit 101 starts a time measurement (S605).

The communication processing unit 101 puts transmission of the confirmation response on standby for the derived delay time Td (S606) and subsequently transfers the confirmation response toward the terminal 30-1 (S607).

Excluding the above, the processing flow example of the processing performed by each configuration in the communication device 10a according to the third example embodiment illustrated in FIG. 2 is the same as the processing flow examples illustrated in FIG. 7 to FIG. 10. The processing flow example of the processing performed by the communication device 10a according to the third example embodiment illustrated in FIG. 2 does not include the processing illustrated in FIG. 11.

When the above description of FIG. 19 is inconsistent with the description of the first example embodiment, the above description of FIG. 19 has priority.

While illustration is omitted, the communication control unit 105 according to the third example embodiment may perform the processing described in the first example embodiment at the same when decreasing traffic related to a terminal a communication status change timing of which is later, as described above. The processing is processing of sending, to a base station, control information for increasing a communication resource quantity related to the terminal the communication status change timing of which is later, around a time at which a predetermined time linked with a high-frequency time difference elapses after performing communication processing of a packet related to the terminal with the later timing.

Advantageous Effects

Based on a communication priority derived based on a synchronization time of communication state changes of terminals, the communication device according to the third example embodiment derives priority information for delaying communication data related to communications of terminals other than a terminal having priority for communication. Then, the communication device delays communication data related to communications of the terminals other than the terminal having priority for communication, in accordance with the priority information. Consequently, a communication related to the terminal having priority for communication is given priority by a base station. Consequently, the communication device can secure quality of a communication of high importance without informing a base station of a communication priority.

From the above, for example, a mobile virtual network operator or the like not directly managing mobile communication network devices such as a base station can secure quality of a communication of high importance without informing a base station or the like of a communication priority.

Fourth Example Embodiment

A communication device according to a fourth example embodiment estimates a position of a terminal by use of the aforementioned high-frequency time difference of communication state changes of terminals. The communication device further sets a communication priority, based on the estimated position of the terminal. When information is sent from communication equipment on the road to a vehicle in road-vehicle communication or the like, a communication from equipment placed at an intersection or the like is considered of higher importance, for example. The communication device enables more accurate communication control by calculating communication importance considering a position.

Configuration and Operation

Figure 20:
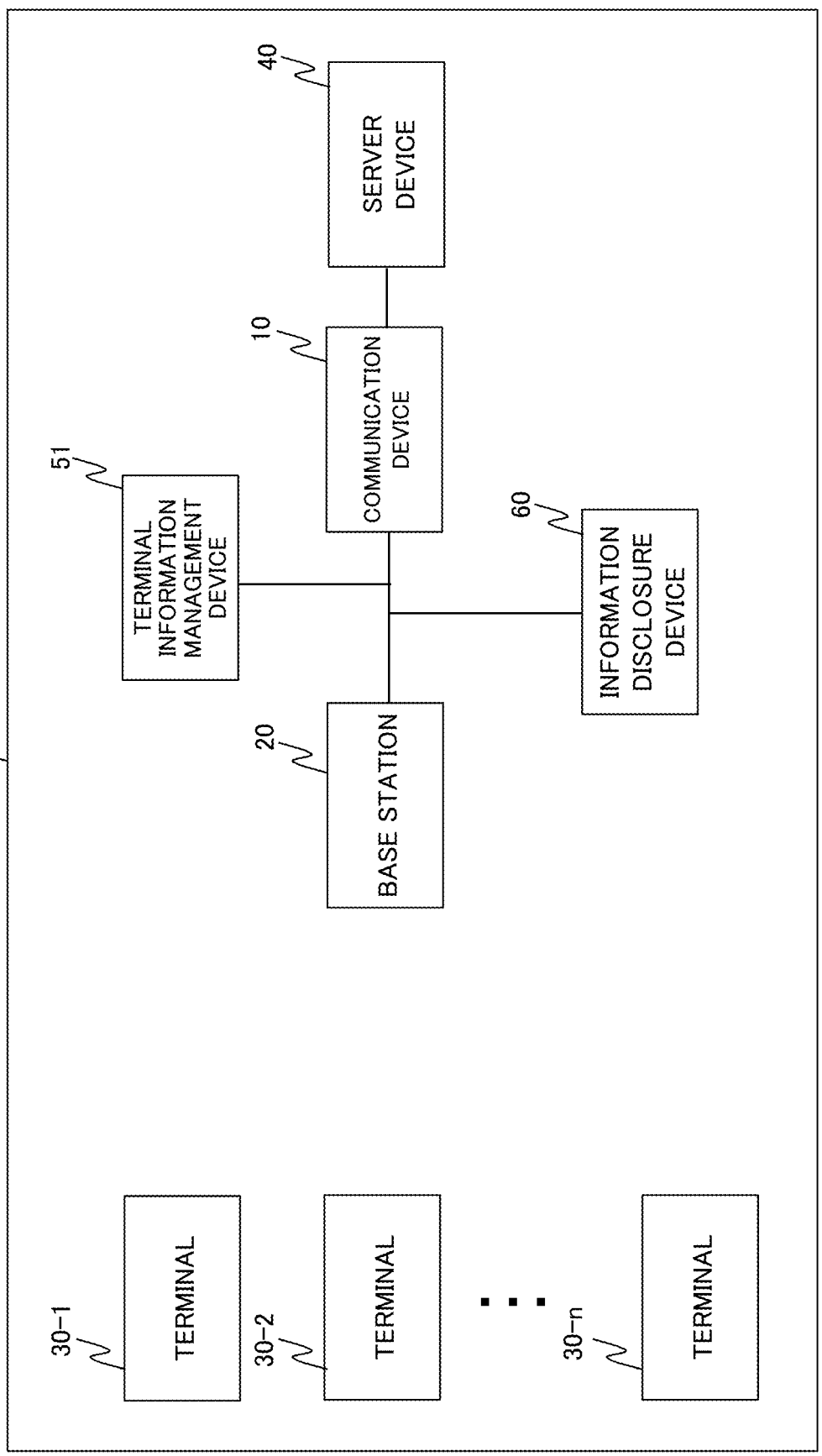
FIG. 20 is a conceptual diagram illustrating a configuration example of a communication system according to a fourth example embodiment.

FIG. 20 is a conceptual diagram illustrating a configuration of a communication system 100 being an example of the communication system according to the fourth example embodiment.

The communication system 100 according to the fourth example embodiment is acquired by adding a terminal information management device 51 and an information disclosure device 60 to the communication system 100 according to the second example embodiment illustrated in FIG. 1.

FIG. 20 illustrates an example of the communication system according to the fourth example embodiment, and another configuration may be assumed as the communication system according to the fourth example embodiment. For example, the communication system according to the fourth example embodiment may include a plurality of base stations 20 and/or server devices 40.

The terminal information management device 51 manages terminal information about each terminal.

For example, terminal information according to the fourth example embodiment includes a base station ID of a base station connected to each terminal and administrator information about an administrator of the terminal. The administrator is an owner of the terminal, or the like.

For example, the information disclosure device 60 is a server connected to the Internet. For example, the information disclosure device 60 distributes open data such as map information.

Excluding the above, the description of FIG. 20 is the same as the description of the communication system 100 according to the first example embodiment illustrated in FIG. 1. When the above description of FIG. 20 is inconsistent with the description of the first example embodiment, the above description of FIG. 20 has priority.

A configuration example of a communication device 10 according to the fourth example embodiment illustrated in FIG. 20 is the same as the configuration example of the communication device 10a according to the first example embodiment illustrated in FIG. 2.

An operation performed by the communication device 10 according to the fourth example embodiment illustrated in FIG. 2 differs from the operation performed by the communication device 10 according to the first example embodiment in the following point.

A derivation unit 104 requests terminal information about each terminal from the terminal information management device 51 and acquires the terminal information. Each piece of the terminal information is information acquired by combining administrator information about an administrator of the terminal with a terminal ID of a terminal and a base station ID of a base station 20 connected to the terminal that are included in terminal information described in the second example embodiment. For example, the administrator is an owner of the terminal. For example, the administrator information includes a name, an address, and the like of the administrator. The terminal information may include an equipment type of the terminal, in addition to the above.

The derivation unit 104 also acquires public information such as map information from the information disclosure device 60 illustrated in FIG. 20.

The derivation unit 104 also estimates a distance between terminals, based on derived synchronization information. The derivation unit 104 further estimates a position of a terminal, based on the estimated distance between terminals, and the acquired terminal information and public information.

For example, the derivation unit 104 derives a distance between terminals, based on synchronization information.

For example, it is assumed that a sensing target from which a terminal 30-1 and a terminal 30-2 acquire predetermined information is previously known to move at a speed of 1 m/s. Then, it is assumed that communication state changes of the terminals 30-1 and 30-2 are synchronized with a high-frequency time difference of 10 seconds. In this case, a distance between the terminals is calculated by multiplying the high-frequency time difference of 10 seconds by the speed of 1 m/s.

The speed is merely an example and may be another speed. The speed may be set to different values depending on an equipment type of a terminal. It may be assumed that synchronization of communication state changes of terminals occurs with movement of a sensing target. Accordingly, the derivation unit 104 may estimate a distance between terminals by multiplying a moving speed of an object assumed to be a sensing target by a synchronization time.

The derivation unit 104 derives a position of a terminal, based on an estimated distance between terminals, and acquired terminal information and public information. For example, it is assumed that a distance between the terminals 30-1 and 30-2 is estimated to be 10 m. In that case, it is assumed that an address of an administrator is acquirable as terminal information of a terminal. In that case, the address of the administrator may be used as a position of the terminal. It is assumed here that an address of an administrator of the terminal 30-1 is acquirable, and a position of the terminal 30-1 is estimated to be a point A indicated by the address.

The derivation unit 104 estimates a point B on the road at a distance of 10 m from the point A to be a position of the terminal 30-2 by use of acquired public information or, to be more specific, map information. Thus, even when acquirable information varies by equipment, a position of a terminal may be estimated by using a combination of various types of acquirable information.

It is assumed that a name of an administrator of a location where each of the terminals 30-1 and 30-2 may be installed is acquirable as terminal information of the terminal. In that case, the derivation unit 104 extracts a plurality of the locations managed by the administrator from map information being acquired public information, based on the name of the administrator. The derivation unit 104 subsequently extracts two of the locations a distance between which matches a distance between the terminals 30-1 and 30-2 from the extracted locations. Then, the derivation unit 104 determines positions of the two locations to be positions of the terminals 30-1 and 30-2.

For example, it is assumed that terminals are installed at coin-operated parking lots being the locations, and a name of an enterprise operating the coin-operated parking lots is acquirable as terminal information. In that case, the derivation unit 104 extracts a plurality of positions of coin-operated parking lots managed by the enterprise from disclosed map information. Then, the derivation unit 104 derives distances between the coin-operated parking lots from the extracted positions of the coin-operated parking lots. Then, the derivation unit 104 specifies positions of the terminals by selecting a combination of coin-operated parking lots a distance between which matches a distance between the terminals.

A communication control unit 105 according to the fourth example embodiment sets a communication priority of a terminal, based on synchronization information, and a position of the terminal estimated by the derivation unit 104.

The communication control unit 105 according to the fourth example embodiment calculates a communication priority of a terminal from synchronization information by the method described in the first example embodiment. Subsequently, the communication control unit 105 according to the fourth example embodiment corrects the communication priority, based on importance of the estimated position of the terminal.

For example, it is assumed that a terminal being a control target based on priority information acquires predetermined information in a surrounding area while moving and sends the acquired information to the server device 40 through the base station 20. Then, it is assumed that while the terminal may move in both a first positional range and a second positional range, the information acquired in the first positional range is more important than the information acquired in the second positional range.

In that case, when the terminal is in the first positional range, the communication control unit 105 determines a correction value f(P) based on importance of the terminal being in the first positional range as a communication priority correction value and adds the value to a calculated communication priority. It is assumed that the correction value f(P) is preset by an administrator of the terminal.

For example, it is assumed that the first positional range is a positional range within 5 m from an intersection, and the second positional range is the remaining range. In that case, for example, the administrator sets a correction value f(P)=0.5 to the first positional range and sets a correction value f(P)=0 to the second positional range.

The correction method of a communication priority described here is merely an example and may be based on another method.

Excluding the above, the description of a communication device 10a according to the fourth example embodiment illustrated in FIG. 2 is the same as the description of the communication device 10a according to the first example embodiment. When the above description is inconsistent with the description of the first example embodiment, the above description has priority.

A configuration example and a description of the derivation unit 104 according to the fourth example embodiment illustrated in FIG. 2 is the same as the configuration and the description of the derivation unit 104 according to the first example embodiment illustrated in FIG. 3.

Figure 21:
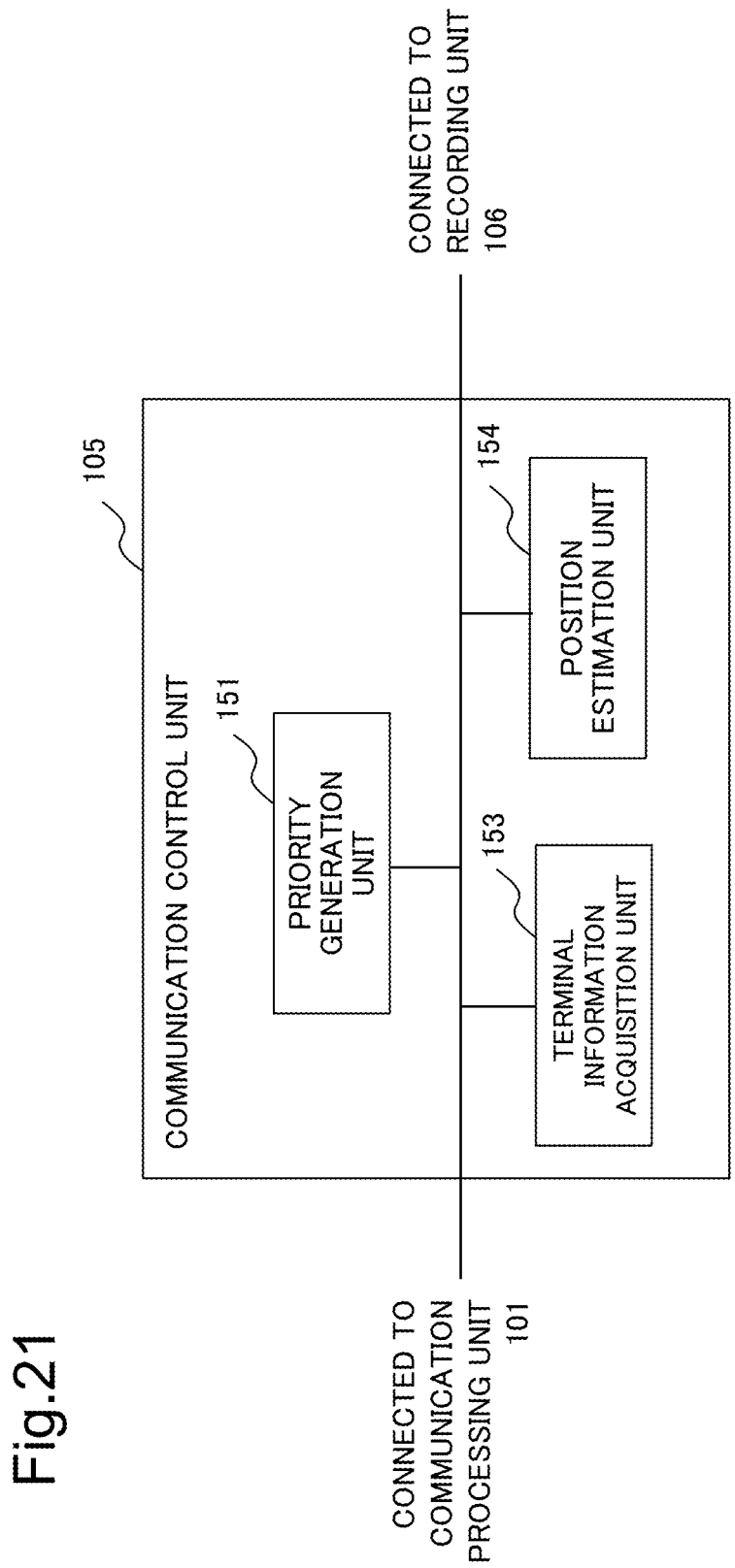
FIG. 21 is a conceptual diagram illustrating a configuration example of a communication control unit according to the fourth example embodiment.

FIG. 21 is a conceptual diagram illustrating a configuration example of the communication control unit 105 according to the fourth example embodiment illustrated in FIG. 2.

The communication control unit 105 illustrated in FIG. 21 includes a terminal information acquisition unit 153 and a position estimation unit 154 in addition to the configuration included in the communication control unit 105 according to the first example embodiment illustrated in FIG. 5.

The terminal information acquisition unit 153 performs a part related to acquisition of the terminal information in the aforementioned operation performed by the communication control unit 105 according to the fourth example embodiment illustrated in FIG. 2.

The position estimation unit 154 performs a part related to derivation of a distance between terminals and positions of two terminals in the aforementioned operation of the communication control unit 105 according to the fourth example embodiment illustrated in FIG. 2.

A priority generation unit 151 performs an operation related to correction of the aforementioned priority information performed by the communication control unit 105 according to the fourth example embodiment illustrated in FIG. 2, in addition to the operation related to priority information derivation performed by the priority generation unit 151 according to the first example embodiment illustrated in FIG. 5.

Processing Flow Example

Figure 22:
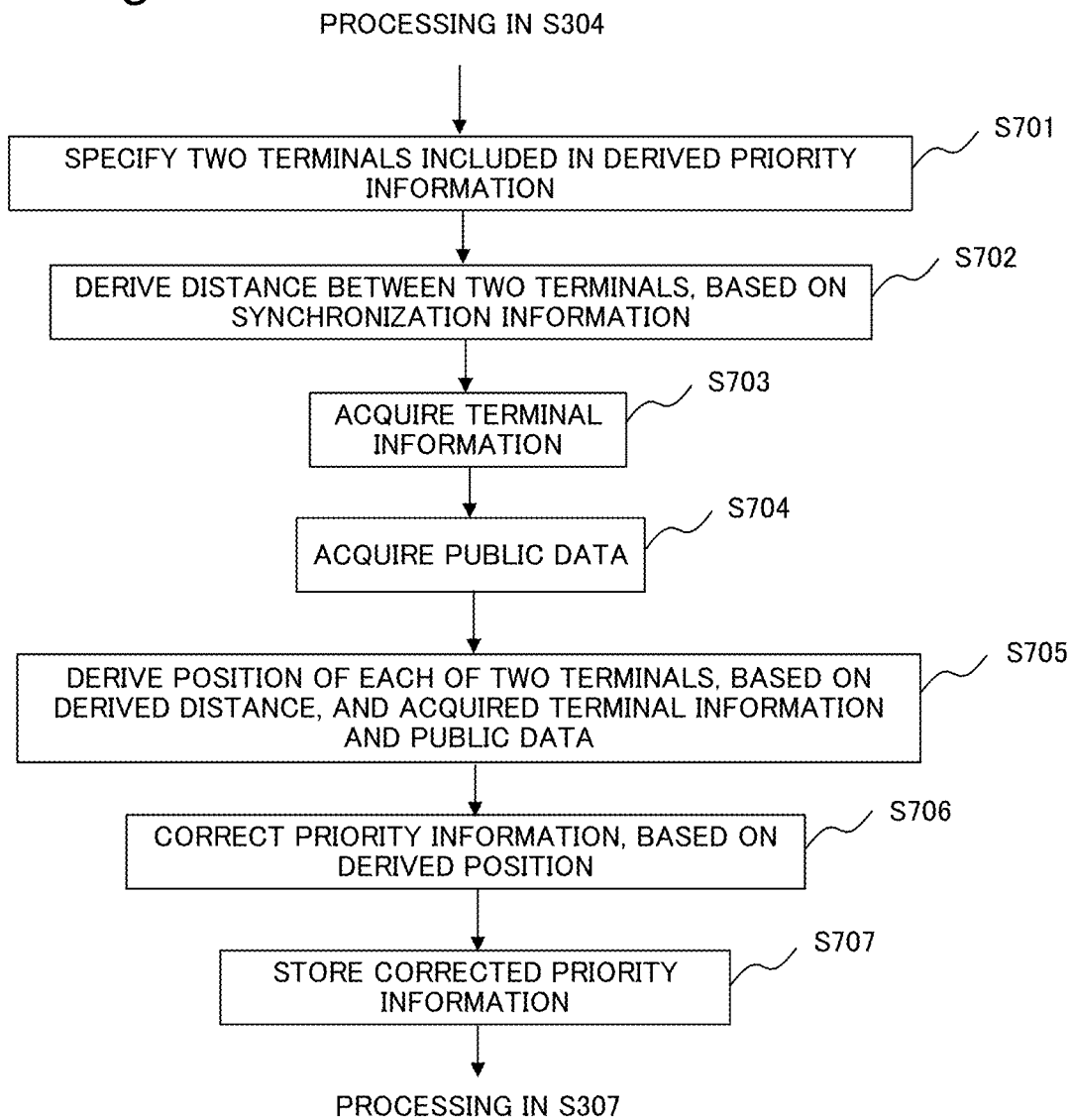
FIG. 22 is a conceptual diagram illustrating a processing flow example of processing replacing processing in S305.

A processing flow example of update processing of a priority information group 204 performed by the communication control unit 105 according to the fourth example embodiment illustrated in FIG. 2 is acquired by replacing the processing in S305 described in FIG. 10 with processing illustrated in FIG. 22.

FIG. 22 is a conceptual diagram illustrating a processing flow example of the processing replacing the processing in S305.

The communication control unit 105 performs processing in S701 after the processing in S304 described in FIG. 10.

When performing the processing in S701, the communication control unit 105 specifies two terminals included in the priority information derived by the processing in S304 described in FIG. 10, as the processing. As described above, a content of priority information is to give priority to communication processing of a packet related to one terminal after performing communication processing of a packet related to the other terminal. The communication control unit 105 specifies the two terminals.

Then, as processing in S702, the communication control unit 105 derives a distance between the two terminals, based on synchronization information. An example of the derivation method is as described above.

Then, as processing in S703, the communication control unit 105 acquires terminal information of the two terminals specified by the processing in S701 from the terminal information management device 51 illustrated in FIG. 20 through a communication processing unit illustrated in FIG. 2. An example of the terminal information is as described above.

Next, as processing in S704, the communication control unit 105 acquires public information from the information disclosure device 60 illustrated in FIG. 20 through the communication processing unit illustrated in FIG. 2. For example, the public information is map information, as described above.

Then, as processing in S705, the communication control unit 105 derives a position of each of the two terminal by, for example, the aforementioned method, based on the distance derived by the processing in S702, the terminal information acquired by the processing in S703, and the public information acquired by the processing in S704.

Then, as processing in S706, the communication control unit 105 corrects the priority information derived by the processing in S304 described in FIG. 10, based on a position of each of the two terminals derived by the processing in S705.

Then, as processing in S707, the communication control unit 105 causes the recording unit 106 illustrated in FIG. 2 to hold the priority information corrected by the processing in S706.

Then, the communication control unit 105 performs the processing in S307 described in FIG. 10.

Excluding the above, the processing flow example of the processing performed by each part of the communication device 10a according to the fourth example embodiment illustrated in FIG. 2 is the same as the processing performed by each part of the communication device 10a according to the first example embodiment illustrated in FIG. 7 to FIG. 11. When the above description is inconsistent with the description of the first example embodiment, the above description has priority.

Specific Example Next, a specific example of the operation performed by the communication device 10a according to the fourth example embodiment illustrated in FIG. 2 will be described. The following description assumes that the communication device 10a detects a communication state change of the terminal 30-1 and performs communication control on the terminal 30-2 in which a communication state change occurs in synchronization with the terminal 30-1.

First, the operation up to the point when the communication control unit 105 illustrated in FIG. 2 detects a communication state change of the terminal 30-1 and derives a communication priority of the terminal 30-2 (S302, yes in S303, and S304 in FIG. 10) is the same as the operation example of the communication control unit 105 according to the first example embodiment.

After S304, the communication control unit 105 according to the fourth example embodiment illustrated in FIG. 2 estimates a position of the terminal 30-2 and corrects a communication priority derived based on the position (S701 to S707 in FIG. 22).

First, the communication control unit 105 estimates a distance between the terminals 30-1 and 30-2, based on synchronization information between the terminal 30-1 and the terminal 30-2 (S701 and S702). When the synchronization information indicates synchronization with a 10-second difference, for example, the derivation unit 104 derives a distance between the two terminals by multiplying 10 seconds by a predetermined speed (assuming 1 m/s). In this example, it is assumed that the distance is derived to be 10 m.

Subsequently, the communication control unit 105 acquires terminal information regarding the terminals 30-1 and 30-2 from the terminal information management device 51 illustrated in FIG. 20 (S703). It is assumed here that the terminal information related to the terminal 30-1 includes a point A being an administrator address. On the other hand, it is assumed that the terminal information related to the terminal 30-2 does not include information indicating a position related to the terminal 30-2.

Next, the communication control unit 105 acquires public information from the information disclosure device 60 illustrated in FIG. 20 (S704). It is assumed here that the communication control unit 105 acquires map information as public information.

The communication control unit 105 derives a position of the terminal 30-2 from the derived distance between the two terminals, and the acquired terminal information and public information (S705). It is assumed here that the communication control unit 105 derives a point B being a position on the road at a distance of 10 m from the point A being the estimated position of the terminal 30-1 as the position of the terminal 30-2.

The communication control unit 105 corrects the communication priority derived by the processing in S304 described in FIG. 10, based on the derived position of the terminal 30-2 (S706).

For example, it is assumed that the terminal 30-2 acquires predetermined information in a surrounding area while moving and sends the acquired information to the server device 40 through the base station 20. Then, it is assumed that while the terminal 30-2 may move in both a positional range of within 5 m from an intersection and the remaining range, the information acquired in the positional range of within 5 m from the intersection is more important than the information acquired in the remaining range.

For example, it is further assumed that a priority derived by the communication control unit 105 is 1.7, and a correction value preset to a case of the position of the terminal 30-2 being within 5 m from the intersection by an administrator of the terminal 30-2 is 0.5.

In that case, when the terminal 30-2 is within the positional range of 5 m from the intersection, the communication control unit 105 determines 2.2 acquired by adding the correction value 0.5 to the priority 1.7 before correction to be the priority after correction. The communication control unit 105 causes the corrected communication priority to be stored into the priority information group 204 illustrated in FIG. 2 (S707).

Then, the communication control unit 105 causes the communication processing unit 101 illustrated in FIG. 2 to send the communication priority to the base station 20 illustrated in FIG. 20 at a predetermined timing (S401 to S403 in FIG. 11).

Advantageous Effects

First, the communication device according to the fourth example embodiment includes the configuration included in the communication device according to the first example embodiment and therefore provides an effect similar to that of the communication device according to the first example embodiment.

In addition, the communication device according to the fourth example embodiment estimates a position of a terminal from a synchronization time of communication state changes of terminals and further sets a communication priority, based on the estimated position of the terminal. Consequently, the communication device according to the fourth example embodiment enables setting of a communication priority of a terminal depending on a position of the terminal. Consequently, the communication device according to the fourth example embodiment enables yet more precise communication control compared with the communication device according to the first example embodiment.

Figure 23:
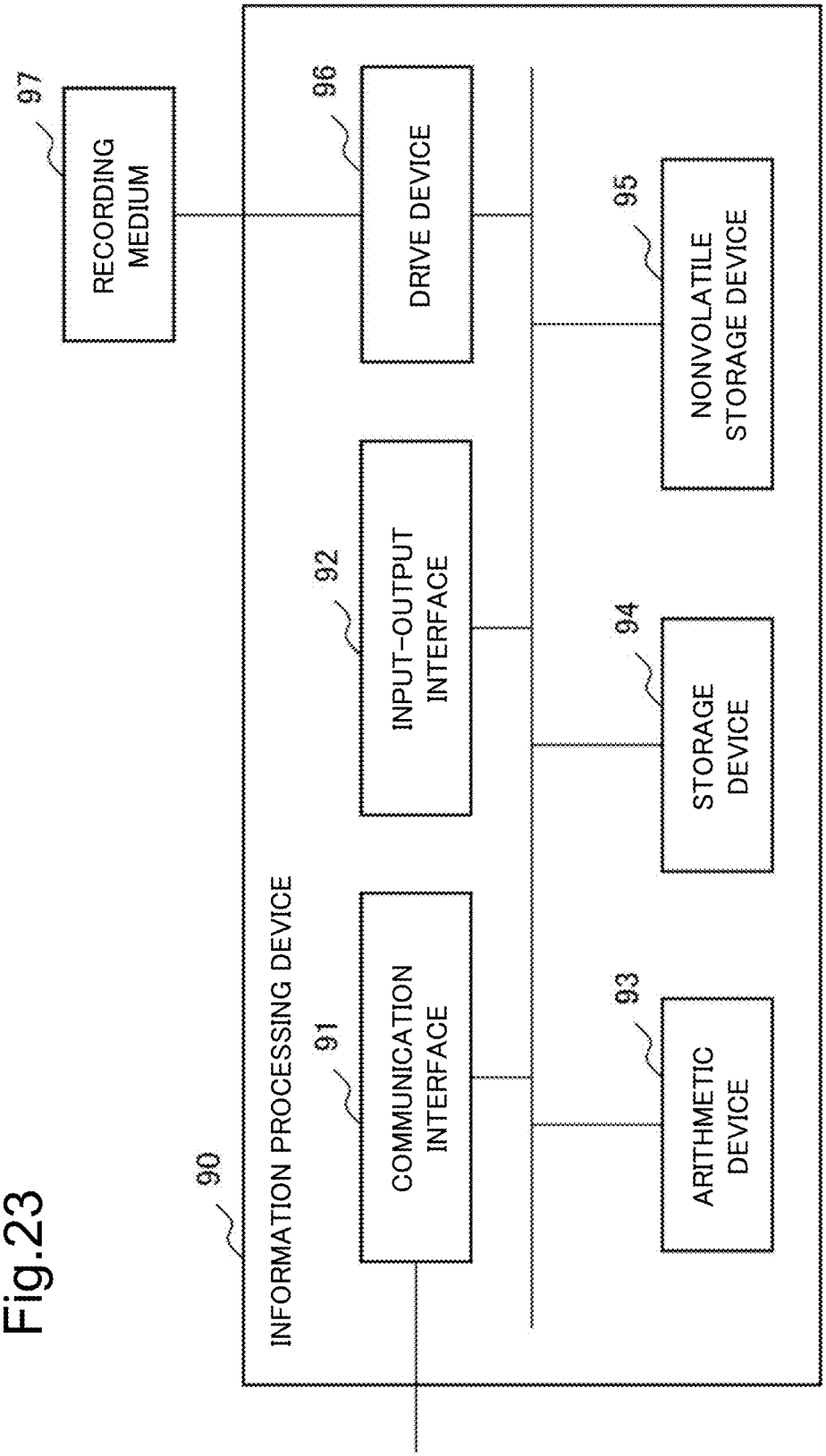
FIG. 23 is a conceptual diagram illustrating a hardware configuration example of an information processing device capable of providing the communication device according to each example embodiment.

FIG. 23 is a conceptual diagram illustrating a hardware configuration example of an information processing device capable of providing the communication device according to each example embodiment. The information processing device 90 includes a communication interface 91, an input-output interface 92, an arithmetic device 93, a storage device 94, a nonvolatile storage device 95, and a drive device 96.

The communication interface 91 is a communication means for the communication device according to each example embodiment to communicate with an external device in a wired and/or wireless manner.

When providing the communication device by use of at least two information processing devices, the devices may be connected in a mutually communicable manner through the communication interface 91.

The input-output interface 92 includes a man-machine interface such as a keyboard being an example of an input device and/or a display as an output device.

The arithmetic device 93 is an arithmetic processing unit such as a general purpose central processing unit (CPU) or a microprocessor. For example, the arithmetic device 93 can read various programs stored in the nonvolatile storage device 95 into the storage device 94 and execute processing in accordance with the read program.

The storage device 94 is a memory device referenceable from the arithmetic device 93, such as a random access memory (RAM), and stores a program, various types of data, and the like. The storage device 94 may be a volatile memory device.

For example, the nonvolatile storage device 95 is a nonvolatile storage device such as a read only memory (ROM) or a flash memory, and is capable of storing various programs, data, and the like.

For example, the drive device 96 is a device processing reading and writing of data from and into a recording medium 97 to be described later.

For example, the recording medium 97 is any recording medium capable of recording data, such as an optical disk, a magneto-optical disk, or a semiconductor flash memory.

For example, each example embodiment of the present invention may be provided by configuring a communication device with the information processing device 90 illustrated in FIG. 23 and supplying a program capable of providing the functions described in each of the aforementioned example embodiments to the communication device.

In this case, the example embodiment can be provided by executing the program supplied to the communication device by the arithmetic device 93. Not all but part of the functions of the communication device may be configured with the information processing device 90.

Furthermore, the communication device may be configured to record the aforementioned program in the recording medium 97 and have the aforementioned program stored into the nonvolatile storage device 95 as appropriate in a shipping stage, an operation stage, or the like of the communication device. In this case, a supply method of the aforementioned program may employ a method of installation into the communication device by use of an appropriate jig in the manufacture stage before shipping, the operation stage, or the like. The supply method of the aforementioned program may employ a common procedure such as a method of external download through a communication line such as the Internet.

Figure 24:
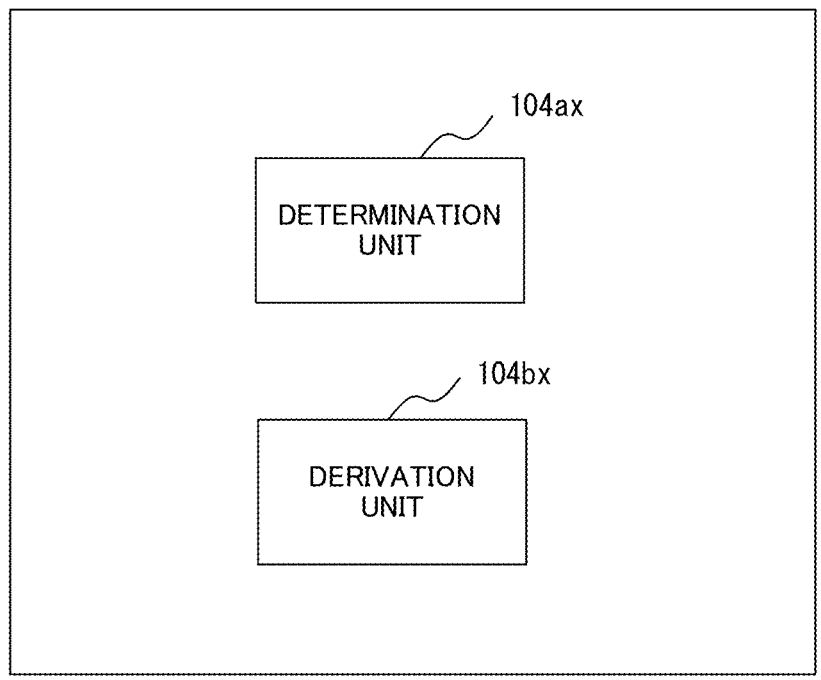
FIG. 24 is a block diagram illustrating a minimum configuration of the communication devices according to the example embodiments.

FIG. 24 is a block diagram illustrating a configuration of a communication device 10x being a minimum configuration of the communication device according to the example embodiments.

The communication device 10x includes a determination unit 104ax and a derivation unit 104bx.

The determination unit 104ax determines occurrence of a change in a communication state of a communication performed between each of a first terminal and a second terminal that communicate with a device connected to a network, and the device.

The derivation unit 104bx derives a second change time at which the change occurs in the second terminal, based on a first change time at which the change occurs in the first terminal. The derivation unit 104bx performs the derivation when occurrence of the change of the second terminal in synchronization with the change of the first terminal is determined.

Information processing terminals such as the first terminal and the second terminal are often installed at different locations close to each other. When information processing such as acquisition of predetermined information is performed in the information processing terminals, communication states change. In other words, a communication a communication state of which changes is an important communication related to the information processing.

For example, such communication state changes often occur among a plurality of information processing terminals in a synchronized manner with a certain time difference following a positional change of a processing target of the information processing. In other words, occurrence of the communication state changes in a synchronized manner in two information processing terminals means that both of the communications are highly likely to be important communications.

Accordingly, a communication performed by the first terminal and the second terminal the change times of which are synchronized is highly likely important.

It is obvious that a quality requirement for communication quality required for a communication of high importance is high.

From the above, the communication device 10x enables prediction of a communication with a high quality requirement.

Accordingly, with the configuration, the communication device 10x provides the effect described in the item "Advantageous Effects of Invention."

For example, the determination unit 104ax illustrated in FIG. 24 is a part in the communication state change detection unit 112 illustrated in FIG. 3, the part determining occurrence of a change in a communication state. The derivation unit 104bx is a part in the synchronization information generation unit 113 illustrated in FIG. 3, the part deriving the first change time and the second change time.

For example, the device is the server device 40 illustrated in FIG. 1, FIG. 15, and FIG. 20. For example, the second communication device is the base station 20 illustrated in FIG. 1, FIG. 15, and FIG. 20. For example, the first change time is the earlier timing of a pair of synchronized change times. For example, the second change time is the later timing of a pair of synchronized change times. For example, the derivation of the second change time is performed by adding the synchronization time difference or the high-frequency time difference to the first change time.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims. For example, a configuration of an element illustrated in each drawing is one example for assisting in understanding of the present invention, and is not limited to the configuration illustrated in each of these drawings.

The whole or part of the example embodiments disclosed above can be described as, but not limited to, the following supplementary notes.

(Supplementary Note 1)

A communication device including:

a determination means for determining occurrence of a change in a communication state of a communication performed between each of a first terminal and a second terminal that communicate with a device connected to a network, and the device; and a derivation means for, when occurrence of the change of the second terminal in synchronization with the change of the first terminal is determined, deriving a second change time at which the change occurs in the second terminal, based on a first change time at which the change occurs in the first terminal.

(Supplementary Note 2)

The communication device according to Supplementary Note 1, further including a control means for deriving control information for, based on the second change time, giving priority, for a predetermined period, to the communication at at least either of the own communication device and a second communication device that are provided between each of the first terminal and the second terminal, and the device, the communication being related to the second terminal.

(Supplementary Note 3)

The communication device according to Supplementary Note 1, wherein the derivation means further calculates a probability that the change occurs in the second terminal at the second change time.

(Supplementary Note 4)

The communication device according to Supplementary Note 2, wherein the derivation means further calculates a probability that the change occurs in the second terminal at the second change time, and the control means derives the control information, based on the probability.

(Supplementary Note 5)

The communication device according to Supplementary Note 4, wherein, when a plurality of the second communication devices exist, the communication device determines the second communication device related to the first terminal and the second communication device related to the second terminal being identical or being located within a predetermined distance to be a factor for determining the synchronized occurrence.

(Supplementary Note 6)

The communication device according to Supplementary Note 2 or 4, wherein the control information is for delaying the communication related to a non-target terminal not being the second terminal.

(Supplementary Note 7)

The communication device according to Supplementary Note 6, wherein the communication device causes the delay by a second delay related to transfer of a confirmation response to a transfer destination, the confirmation response being sent to the non-target terminal.

(Supplementary Note 8)

The communication device according to any one of Supplementary Notes 2, 4, and 6, wherein the control information derives the control information, further based on a position of the second terminal.

(Supplementary Note 9)

The communication device according to any one of Supplementary Notes 1 to 8, further including a position estimation means for estimating a position of the second terminal, based on a time difference between a first change time related to the first terminal and the second change time related to the second terminal, and an estimated position of the first terminal.

(Supplementary Note 10)

The communication device according to Supplementary Note 9, wherein the position estimation means further estimates a position of the first terminal and a position of the second terminal from public information disclosed through a connected network.

(Supplementary Note 11)

The communication device according to any one of Supplementary Notes 1 to 10, wherein the communication state includes at least one of whether the communication is in an active state, a communication frequency, a packet size, increase or decrease in a communication delay, and a communication rate that are related to the communication.

(Supplementary Note 12)

A communication device including:

a determination means for determining occurrence of a change in a communication state of a communication performed between each of a first terminal and a second terminal that communicate with a device connected to a network, and the device; and a derivation means for, when occurrence of the change of the second terminal in synchronization with the change of the first terminal is determined, deriving a first change time at which the change occurs in the first terminal and a second change time at which the change occurs in the second terminal.

(Supplementary Note 13)

The communication device according to Supplementary Note 12, wherein the derivation means derives a synchronization time difference being a difference between the first change time and the second change time, and the communication device further includes a control means for deriving control information for giving priority, for a predetermined period, to the communication at a second communication device provided between each of the first terminal and the second terminal, and the device, the communication being related to a target terminal being at least either of the first terminal and the second terminal.

(Supplementary Note 14)

The communication device according to Supplementary Note 13, wherein the second communication device is a base station.

(Supplementary Note 15)

The communication device according to Supplementary Note 13 or 14, wherein the derivation means determines the synchronization time difference to be a high-frequency time difference being a time difference with a significantly high frequency compared with another time difference out of time differences each of which being a difference between a first terminal change time at which the change occurs in the first terminal and a second terminal change time at which the change occurs in the related second terminal.

(Supplementary Note 16)

The communication device according to Supplementary Note 15, wherein the communication device derives the high-frequency time difference from a time of the change of each of the first terminal and the second terminal in a predetermined period.

(Supplementary Note 17)

The communication device according to Supplementary Note 16, wherein the communication device derives a change time difference being a difference between each time of the change in the period related to one of the first terminal and the second terminal, and each time of the change in the period related to another of the first terminal and the second terminal, and determines the change time difference with a greatest number of the change time difference to be the high-frequency time difference.

(Supplementary Note 18)

The communication device according to Supplementary Note 16 or 17, wherein the communication device derives a synchronization ratio being a ratio of a number of the synchronization time difference in the period to a number of the synchronization time difference in the period.

(Supplementary Note 19)

The communication device according to Supplementary Note 18, wherein the communication device derives the control information from the synchronization ratio.

(Supplementary Note 20)

The communication device according to any one of Supplementary Notes 13 to 19, wherein the communication device receives upstream information sent to the device through the second communication device by each of the first terminal and the second terminal, and transfers the upstream information to the device being a destination.

(Supplementary Note 21)

The communication device according to Supplementary Note 20, wherein, when receiving the upstream information, the communication device acquires terminal identifiers of the first terminal and the second terminal that are included in the upstream information.

(Supplementary Note 22)

The communication device according to any one of Supplementary Notes 13 to 21, wherein the communication device receives downstream information sent to each of the first terminal and the second terminal through the second communication device by the device and transfers the downstream information to each of the first terminal and the second terminal being a destination.
(Supplementary Note 23)

The communication device according to Supplementary Note 22, wherein, when receiving the downstream information, the communication device acquires a terminal identifier of each of the first terminal and the second terminal that are included in the downstream information.
(Supplementary Note 24)

The communication device according to any one of Supplementary Notes 13 to 23, wherein the control information is for increasing a communication resource in the second communication device related to either of the first terminal and the second terminal related to a later of the first change time and the second change time that are related to the synchronization time difference, around a time later than a communication processing time related to the either of the first terminal and the second terminal by a predetermined time, the communication processing time corresponding to an earlier of the first change time and the second change time that are related to the synchronization time difference.
(Supplementary Note 25)

The communication device according to Supplementary Note 24, wherein the communication device derives the time from the synchronization time difference.
(Supplementary Note 26)

The communication device according to Supplementary Note 24, wherein the time is the synchronization time difference.
(Supplementary Note 27)

The communication device according to any one of Supplementary Notes 13 to 26, wherein the communication device sends the control information to the second communication device.
(Supplementary Note 28)

The communication device according to any one of Supplementary Notes 13 to 27, wherein the control information is for causing a first delay in transfer of communication information related to the communication performed between a non-target terminal not being the target terminal out of the first terminal and the second terminal, and the second communication device.
(Supplementary Note 29)

The communication device according to Supplementary Note 28, wherein the communication device causes the first delay by causing a second delay in transfer of a confirmation response to a transfer destination, the confirmation response being sent to the non-target terminal.
(Supplementary Note 30)

The communication device according to any one of Supplementary Notes 13 to 29, wherein the communication device derives the control information, based on a target terminal position being a position of the target terminal.
(Supplementary Note 31)

The communication device according to Supplementary Note 30, wherein the communication device estimates the target terminal position from an estimated value of a first position being a position of a terminal not being the target terminal out of the first terminal and the second terminal, the synchronization time difference, and public information disclosed through a connected network.
(Supplementary Note 32)

The communication device according to Supplementary Note 31, wherein the public information is map information.
(Supplementary Note 33)

The communication device according to any one of Supplementary Notes 13 to 32, wherein the communication state includes at least one of whether the communication is in an active state, a communication frequency, a packet size, increase or decrease in a communication delay, and a communication rate that are related to the communication.
(Supplementary Note 34)

A communication method including:

acquiring a change time being a time at which a change occurs in a communication state of a communication performed between each of a first terminal and a second terminal that communicate with a device connected to a network, and the device;

deriving a synchronization time difference being a difference between a first change time included in the change time of the first terminal and a second change time included in the change time of the second terminal in a case of the first change time being determined to be synchronized with the second change time; and deriving control information for giving priority, for a predetermined period, to the communication at a second communication device provided between each of the first terminal and the second terminal, and the device, the communication being related to a target terminal being at least either of the first terminal and the second terminal.
(Supplementary Note 35)

A non-transitory computer-readable medium having a communication program recorded thereon, the communication program causing a computer to execute:

processing of acquiring a change time being a time at which a change occurs in a communication state of a communication performed between each of a first terminal and a second terminal that communicate with a device connected to a network, and the device;

processing of deriving a synchronization time difference being a difference between a first change time included in the change time of the first terminal and a second change time included in the change time of the second terminal in a case of the first change time being determined to be synchronized with the second change time; and processing of deriving control information for giving priority, for a predetermined period, to the communication at a second communication device provided between each of the first terminal and the second terminal, and the device, the communication being related to a target terminal being at least either of the first terminal and the second terminal.
(Supplementary Note 36)

A communication method including:

determining occurrence of a change in a communication state of a communication performed between each of a first terminal and a second terminal that communicate with a device connected to a network, and the device; and, when occurrence of the change of the second terminal in synchronization with the change of the first terminal is determined, deriving a second change time at which the change occurs in the second terminal, based on a first change time at which the change occurs in the first terminal.

(Supplementary Note 37)

A non-transitory computer-readable medium having a communication program recorded thereon, the communication program causing a computer to execute:

processing of determining occurrence of a change in a communication state of a communication performed between each of a first terminal and a second terminal that communicate with a device connected to a network, and the device; and processing of, when occurrence of the change of the second terminal in synchronization with the change of the first terminal is determined, deriving a second change time at which the change occurs in the second terminal, based on a first change time at which the change occurs in the first terminal.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-251548, filed on Dec. 27, 2017, the disclosure of which is incorporated herein in its entirety by reference.

REFERENCE SIGNS LIST 10, 10a, 10x Communication device
20, 20-1, 20-2 Base station
30-1, 30-2, 30-n Terminal
40 Server device
50 Terminal information management device
60 Information disclosure device
90 Information processing device
91 Communication interface
92 Input-output interface
93 Arithmetic device
94 Storage device
95 Nonvolatile storage device
96 Drive device
97 Recording medium
100 Communication system
101 Communication processing unit
104, 104bx Derivation unit
104ax Determination unit
105 Communication control unit
106 Recording unit
111 Terminal selection unit
112 Communication state change detection unit
113 Synchronization information generation unit
114 Terminal information acquisition unit
151 Priority generation unit
152 Delay time derivation unit
153 Terminal information acquisition unit
154 Position estimation unit
201, 201a Communication information group
202, 202a Synchronization information group
203 Communication state information group
204 Priority information group
206a, 206b, 206c Synchronization information

What is claimed is:

1. A communication device comprising:
a determination unit configured to determine occurrence of a change in a communication state of a communication performed between each of a first terminal and a second terminal that communicate with a device connected to a network, and the device; and
a derivation unit configured to, when occurrence of the change of the second terminal in synchronization with the change of the first terminal is determined, derive a second change time at which the change occurs in the second terminal, based on a first change time at which the change occurs in the first terminal; and
a control unit configured to derive control information for, based on the second change time, giving priority, for a predetermined period, to the communication at least either of the communication device and a second communication device that are provided between each of the first terminal and the second terminal, and the device, the communication being related to the second terminal.

2. The communication device according to claim 1, wherein
the derivation unit further calculates a probability that the change occurs in the second terminal at the second change time, and
the control unit derives the control information, based on the probability.

3. The communication device according to claim 2, wherein,
when a plurality of the second communication devices exist, the communication device determines the second communication device related to the first terminal and the second communication device related to the second terminal being identical or being located within a predetermined distance to be a factor for determining a synchronized occurrence.

4. A communication device comprising:
a determination unit configured to determine occurrence of a change in a communication state of a communication performed between each of a first terminal and a second terminal that communicate with a device connected to a network, and the device; and
a derivation unit configured to, when occurrence of the change of the second terminal in synchronization with the change of the first terminal is determined, derive a first change time at which the change occurs in the first terminal and a second change time at which the change occurs in the second terminal,
the derivation unit derives a time difference being a difference between the first change time and the second change time, and
the communication device further comprises a control unit configured to derive control information for giving priority, for a predetermined period, to the communication at a second communication device provided between each of the first terminal and the second terminal, and the device, the communication being related to a target terminal being at least either of the first terminal and the second terminal.

5. The communication device according to claim 4, wherein
the derivation unit determines a synchronization time difference being the time difference between the first change time and the second change time synchronizing each other to be a high-frequency time difference being the time difference with a significantly high frequency compared with the other time difference out of the time differences each of which being a difference between a first terminal change time at which the change occurs in the first terminal and a second terminal change time at which the change occurs in the related second terminal.

6. The communication device according to claim 5, wherein
the communication device derives the high-frequency time difference from a time of the change of each of the first terminal and the second terminal in a predetermined period.

7. The communication device according to claim 6, wherein
the communication device derives a change time difference being a difference between each time of the change in the period related to one of the first terminal and the second terminal, and each time of the change in the period related to another of the first terminal and the second terminal, and determines the change time difference with a greatest number of the change time difference to be the high-frequency time difference.

8. The communication device according to claim 6, wherein
the communication device derives a synchronization ratio being a ratio of a number of the synchronization time difference in the period to a number of the time difference in the period.

9. The communication device according to claim 4, wherein
the communication device receives upstream information sent to the device through the second communication device by each of the first terminal and the second terminal, and transfers the upstream information to the device being a destination.

10. The communication device according to claim 4, wherein
the communication device receives downstream information sent to each of the first terminal and the second terminal through the second communication device by the device and transfers the downstream information to each of the first terminal and the second terminal being a destination.

11. The communication device according to claim 4, wherein
the communication device derives the control information, based on a target terminal position being a position of the target terminal.

12. The communication device according to claim 11, wherein
the communication device estimates the target terminal position from an estimated value of a first position being a position of a terminal not being the target terminal out of the first terminal and the second terminal, the synchronization time difference, and public information disclosed through a connected network.

13. A communication method comprising:
acquiring a change time being a time at which a change occurs in a communication state of a communication performed between each of a first terminal and a second terminal that communicate with a device connected to a network, and the device;
deriving a time difference being a difference between a first change time included in the change time of the first terminal and a second change time included in the change time of the second terminal in a case of the first change time being determined to be synchronized with the second change time; and
deriving control information for giving priority, for a predetermined period, to the communication at a second communication device provided between each of the first terminal and the second terminal, and the device, the communication being related to a target terminal being at least either of the first terminal and the second terminal.

* * * * *